US012718688B2

(12) United States Patent
Moynihan et al.

(10) Patent No.: US 12,718,688 B2
(45) **Date of Patent: *Aug. 25, 2026**

(54) REAL TIME INFORMATION SYSTEM FOR ROAD USERS

(71) Applicant: LAGAN CRAWL LIMITED, Galway (IE)

(72) Inventors: John Moynihan, Ballycotton (IE); Tony Maguire, Kinvara (IE); Sean Loughlin, Belfast (GB); Michael Hayward, Carshalton Beeches (GB); Martin Kelly, Stockport (GB)

(73) Assignee: Lagan Crawl Limited, Galway (IE)

( * ) Notice: Subject to any disclaimer, the term of this patent is extended or adjusted under 35 U.S.C. 154(b) by 54 days.

This patent is subject to a terminal disclaimer.

(21) Appl. No.: 18/809,109

(22) Filed: Aug. 19, 2024

(65) Prior Publication Data

US 2024/0412627 A1 Dec. 12, 2024

Related U.S. Application Data

(63) Continuation of application No. 18/037,164, filed as application No. PCT/EP2021/085542 on Dec. 13, 2021, now Pat. No. 12,367,765.

(30) Foreign Application Priority Data

Dec. 22, 2020 (EP) .................................... 20216720

(51) Int. Cl.
*G08G 1/09* (2006.01)
*G08G 1/01* (2006.01)

(52) U.S. Cl.
CPC ............. *G08G 1/09* (2013.01); *G08G 1/0116* (2013.01); *G08G 1/0133* (2013.01); *G08G 1/0141* (2013.01)

(58) Field of Classification Search
CPC ...... G08G 1/09; G08G 1/0116; G08G 1/0133; G08G 1/0141; G08G 1/095; G08G 1/0955; E01F 9/669; E01F 9/617
(Continued)

(56) References Cited

U.S. PATENT DOCUMENTS 3,872,423 A 3/1975 Yeakley
5,244,172 A 9/1993 Allega
(Continued)

FOREIGN PATENT DOCUMENTS

CN 101452647 A 6/2009
TW 200923159 A 6/2009
(Continued)

OTHER PUBLICATIONS

International Search Report issued in PCT/EP2021/085542; mailed Mar. 21, 2022.
(Continued)

*Primary Examiner* — Tai T Nguyen
(74) *Attorney, Agent, or Firm* — Studebaker Brackett PLLC

(57) ABSTRACT

A real time information system provides real time comprehensive information to drivers on roads. It has short-interval units for mounting on a roadside barrier at intervals of 100 m and lower-density master control units at 1 km separations with more comprehensive displays. The short-interval units communicate with a master unit in a local area group. Local sensing of weather and traffic conditions at the master control unit allows advance warnings to drivers with a fast response time in an autonomous manner. The short-interval units have a saddle frame for fitting to the top of a central reservation barrier to allow low-level simple display of LED colour arrangements in a coordinated linear pattern when viewed in sequence by a driver. A subset of the short-interval
(Continued)

saddle units, such as every tenth one may additionally have a display screen.

14 Claims, 28 Drawing Sheets

(58) Field of Classification Search
USPC .......................................................... 340/905
See application file for complete search history.

(56) References Cited

U.S. PATENT DOCUMENTS

| | | | |
|---|---|---|---|
| 5,673,039 A | 9/1997 | Pietzsch et al. | |
| 6,718,672 B1 * | 4/2004 | Wieringa | G09F 19/22 40/607.13 |
| 7,069,680 B1 | 7/2006 | Crawford | |
| 9,637,942 B2 * | 5/2017 | White | E04H 12/003 |
| 10,176,713 B2 * | 1/2019 | Hong | G08B 25/10 |
| 2009/0153361 A1 | 6/2009 | Chen | |
| 2016/0024731 A1 | 1/2016 | Sanchez De La Cruz | |
| 2016/0076209 A1 * | 3/2016 | Maus | E01F 15/146 404/6 |
| 2023/0410649 A1 | 12/2023 | Moynihan et al. | |
| 2024/0270156 A1 * | 8/2024 | Yamasaki | G06V 10/60 |

FOREIGN PATENT DOCUMENTS

| | | |
|---|---|---|
| WO | 2007/136458 A2 | 11/2007 |
| WO | 2012/035499 A2 | 3/2012 |

OTHER PUBLICATIONS

The extended European search report issued by the European Patent Office on Oct. 2, 2024, which corresponds to EP 24194791.0-1206 and is related to U.S. Appl. No. 18/809,109.
Lee et al., Effects of Shock Waves on Freeway Crash Likelihood, The Open Transportation Journal, 2010, pp. 61-70, vol. 4.

* cited by examiner

REAL TIME INFORMATION SYSTEM FOR ROAD USERS

This application is a continuation application of U.S. patent application Ser. No. 18/037,164, now U.S. Pat. No. 12,367,765, which is hereby incorporated by reference in its entirety.

The present invention relates to provision of information, especially warnings, and instruction for improved road safety.

It is known to provide information displays which are updated to provide information to drivers warning of road conditions and traffic in order to improve road safety and traffic management.

U.S. Pat. Nos. 5,244,172, 7,069,680, and WO2007/136458 describe sign or reflector support stands which are mountable to a concrete barrier. WO2012/035499 describes a system for detecting a warning condition in a section of a roadway.

The present invention is directed towards providing a real time information system in which there is very comprehensive and timely warning information and instruction provided to drivers in a manner which reduces chances of incidents occurring, and which optimises the manner in which incidents are responded to.

SUMMARY OF THE DISCLOSURE

We describe a real time information system for providing real time information to drivers on roads, the system comprising:

- a plurality of short-interval units each adapted to be mounted along a road central reservation or verge, and comprising a digital data processor, a communications interface, and at least one display component for conveying advance driver warning information when viewed in a sequence in a linear pattern along a road with other said short interval unit display components, wherein at least some of the short-interval units are configured to fit to a central reservation barrier of a dual carriageway, and:
  - at least some of said short-interval units have a saddle-shaped configuration for fitting to a top surface of a barrier, with a top housing and side substrates for fitting to sides of a barrier beneath the top housing, at least one side substrate supporting a lower display component with light sources, and
  - the digital data processor and the lower display components are configured to generate displays which do not include a written message required to be read by a driver, but provide simple warnings due to colour, and/or intensity, and/or blinking frequency of the light sources;
- a plurality of longer-interval master control units for roadside mounting, each comprising a digital data processor and a communications interface; and in which at least some of the master control units are linked with sensors for weather and/or traffic condition and/or road condition sensing, and in which the processor is configured to process sensor feeds and to generate and communicate signals to some of said short-interval units in a local area group; and in which at least some of the master control units each comprises a display which is controlled by said processor;
- wherein the processors of at least some of the master control units are configured to operate in real time to automatically:

- acquire traffic and/or weather and/or road condition data,
  - process said condition data to determine that there are reasons for driver warnings,
  - communicate with local short-interval units and upstream master control units to instruct them to generate warning displays, and to
  - operate in an autonomous manner without instruction from a remote server or host to make decisions on local real time advance warnings Preferably, the short-interval units are configured to be mounted with a separation in the range of 50 m to 1 km apart, more preferably 50 m to 500 m. Preferably, at least some short-interval units comprise a lower display component on both lateral sides, for visibility by drivers on both sides of a dual carriageway, thereby providing bi-directional use. Preferably, at least some lower display components each comprises light sources mounted on a base plate. Preferably, said light sources comprise an array of LEDs.

Preferably, at least some short-interval units comprise a flange on one or both lateral sides and at least some of the lower display components are configured to push fit into the side flange for mechanical and electrical inter-connection. Preferably, at least some of the display components are elongate and have a centrally mounted elongate array of light sources such as LEDs. Preferably, at least some short-interval units the top housing houses the digital data processor.

Preferably, the top housing of at least some short-interval saddle units is configured to connect in a modular manner with a solar panel component. Preferably, the top housing is configured to fit to a solar panel component such that the solar panel component is horizontally arranged in a manner which is approximately co-planar with the top housing, and preferably the top housing is configured to connect with a series of more than one solar panel component on each longitudinal end, thereby utilizing space on a barrier in the longitudinal directions.

Preferably, at least some of said short-interval units comprise a saddle-shape frame for fitting to a top surface of a barrier, with the top housing and side flanges extending downwardly and laterally, at least one side flange supporting the lower display component with light sources.

Preferably, a sub-set of the short-interval units additionally includes a display screen for displaying a pictorial and/or textual driver message which is coordinated with the display component operation. Preferably, the master control units are configured to communicate with other master control units over a wide area network, and with short-interval units within a local area network.

Preferably, the processors of at least some of the master control units are configured to temporarily enter a sleep mode in a pattern of a plurality of units to save available power. Preferably, the processors of at least some of the master control units are configured to operate in a control scheme as instructed by a central host server. Preferably, the processors of at least some of the master control units are configured to receive image data from cameras (4) at least one of which is facing upstream and at least one of which is facing downstream.

Preferably, the processors of at least some of the master control units are configured to cause higher-resolution image data to be received and processed on a selective basis according to events locally.

We also describe a method of operation of a real time information system of any example described herein, the method comprising:

- a first master control unit determining that a warning is to be provided to approaching drivers, and
- the first master control unit communicating a command to nearby short-interval units and said units activating their lower display components to provide a driver warning in a linear pattern with short intervals in the range of 30 m to 1 km, preferably 50 m to 500 m.

Preferably, at least some of the short-interval units provide driver warnings on both sides of a dual carriageway, bi-directionally for drivers approaching from both directions. Preferably, the first master control unit additionally communicates warning information to other master control units, upon which they cause their nearby short-interval units to provide a driver warning for drivers approaching from further away.

Preferably, at least one master control unit provides a warning display on a display screen to complement a warning provided by the short-interval units. Preferably, the first master control unit determines that a warning should be provided according to sensor signals from sensors located nearby.

Preferably, the first master control unit operates in an autonomous manner to cause the driver warnings to be provided, without need for an instruction from a remote host.

We also describe a short interval warning device for a road central reservation, the device being configured to fit to a central reservation barrier of a dual carriageway and comprising a digital data processor, a communications interface and at least one display component with light sources for conveying advance driver warning information when viewed in a sequence along a road in response to signals received by the digital data processor via the communications interface, wherein the device has a saddle-shaped configuration comprising a top housing for fitting to a top surface of a barrier and side substrates, each side substrate supporting a lower display component including light sources.

Preferably, said light sources comprise an array of LEDs. Preferably, the top housing comprises at least one side flange and each lower display component is configured to push fit into a side flange for mechanical and electrical inter-connection. Preferably, the lower display components are elongate in a downward direction and support an elongate array of light sources such as LEDs.

Preferably, the top housing houses the digital data processor. Preferably, the top housing is configured to connect in a modular manner with a solar panel component.

Preferably, top housing is configured to fit to a solar panel component such that the solar panel component is horizontally arranged in a manner which is approximately co-planar with the top housing.

Preferably, the top housing is configured to connect with a series of more than one solar panel component on each longitudinal end, thereby utilizing space on a barrier in the longitudinal directions.

We also describe a real time information system for providing real time information to drivers on roads, the system comprising:

- a plurality of short-interval units each adapted to be mounted along a road central reservation or verge, and comprising a digital data processor, a communications interface, and at least one display component for conveying advance driver warning information when viewed in a sequence in a linear pattern along a road with other short interval unit display components; and
- a plurality of longer-interval master control units ("MCUs") for roadside mounting, each comprising a digital data processor, and a communications interface, and in which the processor is configured to generate and communicate signals to short-interval units in a local area group.

Preferably, at least some of the MCUs are linked with sensors for weather and/or traffic condition sensing, and in which their processors are configured to process sensor feeds. Preferably, at least some of the MCUs comprise a display which is controlled by said MCU processor.

The MCUs and short-interval units operate in a coordinated manner to provide real time information to drivers in a very effective manner.

In various examples, the processors of at least some of the MCUs are configured to operate in real time to automatically:

- acquire traffic condition and weather condition data, and to
- process said condition data to determine that there are reasons for driver warnings and to communicate with local short-interval units and upstream MCUs to instruct them to generate warning displays.

Preferably, at least some of the MCUs are configured to operate in an autonomous manner without instruction from a remote server or host to make decisions on local real time advance warnings. The sensors linked with the MCUs may include sensors for weather conditions, road conditions, and vehicles. Preferably, the short-interval unit display components are configured to generate displays which do not include a written message required to be read by a driver, but provide simple warnings due to the colour, and/or intensity, and/or blinking frequency of light sources.

Preferably, the short-interval units are configured to be mounted with a separation in the range of 50 m to 1 km apart, more preferably 50 m to 500 m. The linear pattern of the display components of the short interval units is particularly clear and effective with separations of this order.

Preferably, at least some of the short-interval units are configured to fit to a central reservation barrier of a dual carriageway. In some examples, at least some of the short-interval units are saddle-shaped to straddle a central reservation barrier, and the display components are on both lateral sides, for visibility by drivers on both sides of a dual carriageway, thereby providing bi-directional use.

Preferably, at least some of said short-interval units comprise a saddle-shaped frame for fitting to a top surface of a barrier, with a top housing and side flanges extending downwardly and laterally. Preferably, a sub-set of the short-interval units includes a display screen (80) for displaying a pictorial and/or textual driver message which is coordinated with the display component operation. In some examples, each side flange is adapted to fit to a lower display component with said light sources. Preferably, the lower display component comprises light sources mounted on a base plate. Preferably, said light sources comprise an array of LEDs.

In some examples, the display components are configured to push fit into the side flange for mechanical and electrical inter-connection. In some examples, the display components are elongate and extend downwardly and have a centrally-mounted elongated array of light sources such as LEDs. In some examples, the top housing houses the digital data processor.

In some examples, the frame is configured to connect in a modular manner with a solar panel component. Preferably, the frame is configured to fit to a solar panel component such that the solar panel component is horizontally arranged in a manner which is approximately co-planar with the top housing. In some examples, the frame is configured to connect with a series of more than one solar panel component on each longitudinal end, thereby utilizing space on a barrier in the longitudinal directions.

In some examples, the MCUs are configured to communicate with other MCUs over a wide area network, and with short-interval units within a local area network. Preferably, at least some of the MCUs comprise a display screen, and the MCUs generate signals within the system to ensure coordination with the short-interval units. In some examples, the processors of at least some of the MCUs are configured to temporarily enter a sleep mode in a pattern of a plurality of units in order to save available power.

In some examples, the processors of at least some of the MCUs are configured to operate in a control scheme as instructed by a central host server. In some examples, the processors of at least some of the MCUs are configured to receive image data from cameras at least one of which is facing upstream and at least one of which is facing downstream. Preferably, the processors of at least some of the MCUs are configured to cause higher-resolution image data to be received and processed on a selective basis according to events locally.

We also describe a short interval warning device for a road central reservation, the device being configured to fit to a central reservation barrier of a dual carriageway and comprising a digital data processor, a communications interface and at least one display component with light sources for conveying advance driver warning information when viewed in a sequence along a road.

In some examples, the device comprises a saddle-shaped frame for fitting to a top surface of a barrier, with a top housing and side flanges extending downwardly and laterally. In some examples, each side flange is adapted to fit to a lower display component.

In some examples, the lower display component comprises light sources mounted on a base plate. In some examples, said light sources comprise an array of LEDs. In some examples, the display components are configured to push fit into the side flange for mechanical and electrical inter-connection.

In some examples, the display components are elongated and extend downwardly and have a centrally-mounted elongate array of light sources such as LEDs. Preferably, the top housing houses the digital data processor. In some examples, the frame is configured to connect in a modular manner with a solar panel component.

In some examples, the frame is configured to fit to a solar panel component such that the solar panel component is horizontally arranged in a manner which is approximately co-planar with the top housing. In some examples, the frame is configured to connect with a series of more than one solar panel component on each longitudinal end, thereby utilizing space on a barrier in the longitudinal directions. In some examples, the device further comprises a display screen mounted to the housing.

We also describe a method of operation of a real time information system of any example described herein, the method comprising:

- a first MCU determining that a warning is to be provided to approaching drivers, and
- the first MCU communicating a command to nearby short-interval units, and said units activating their displays to provide a driver warning in a linear pattern with short intervals in the range of 30 m to 1 km, preferably 50 m to 500 m.

In some examples, at least some of the short-interval units provide driver warnings on both sides of a dual carriageway, bi-directionally for drivers approaching from both directions. In some examples, the first MCU additionally communicates warning information to other MCUs, upon which they cause their nearby short-interval units to provide a driver warning for drivers approaching from further away. In some examples, at least one MCU provides a warning display on a display screen to complement the warning provided by the short-interval units. In some examples, the first MCU determines that a warning should be provided according to sensor signals from sensors located nearby. In some examples, the first MCU operates in an autonomous manner to cause the driver warnings to be provided, without need for an instruction from a remote host.

DETAILED DESCRIPTION OF THE INVENTION

The invention will be more clearly understood from the following description of some embodiments thereof, given by way of example only with reference to the accompanying drawings in which:

FIGS. 3 to 13 are views of a short-interval saddle unit of the system, in which:

Figure 3:
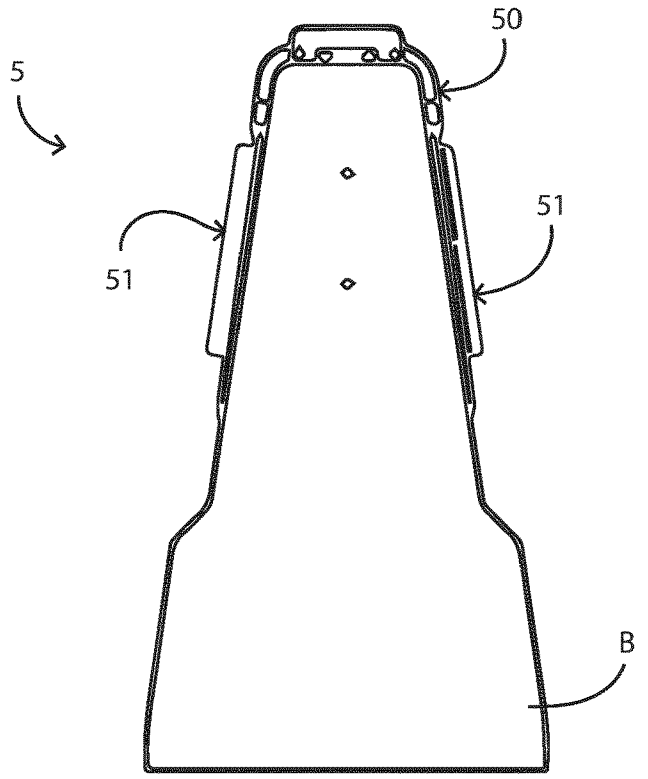
Figure 4:
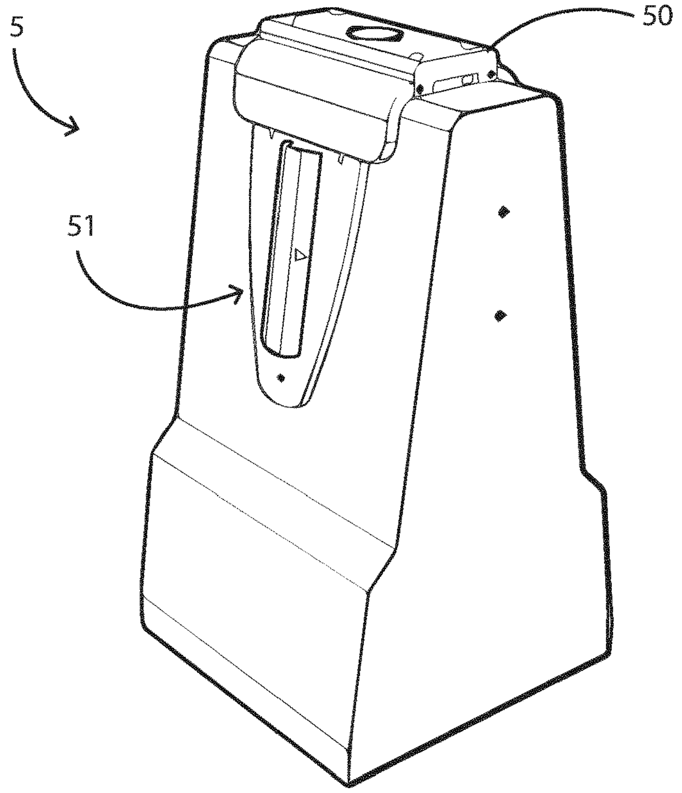
Figure 5:
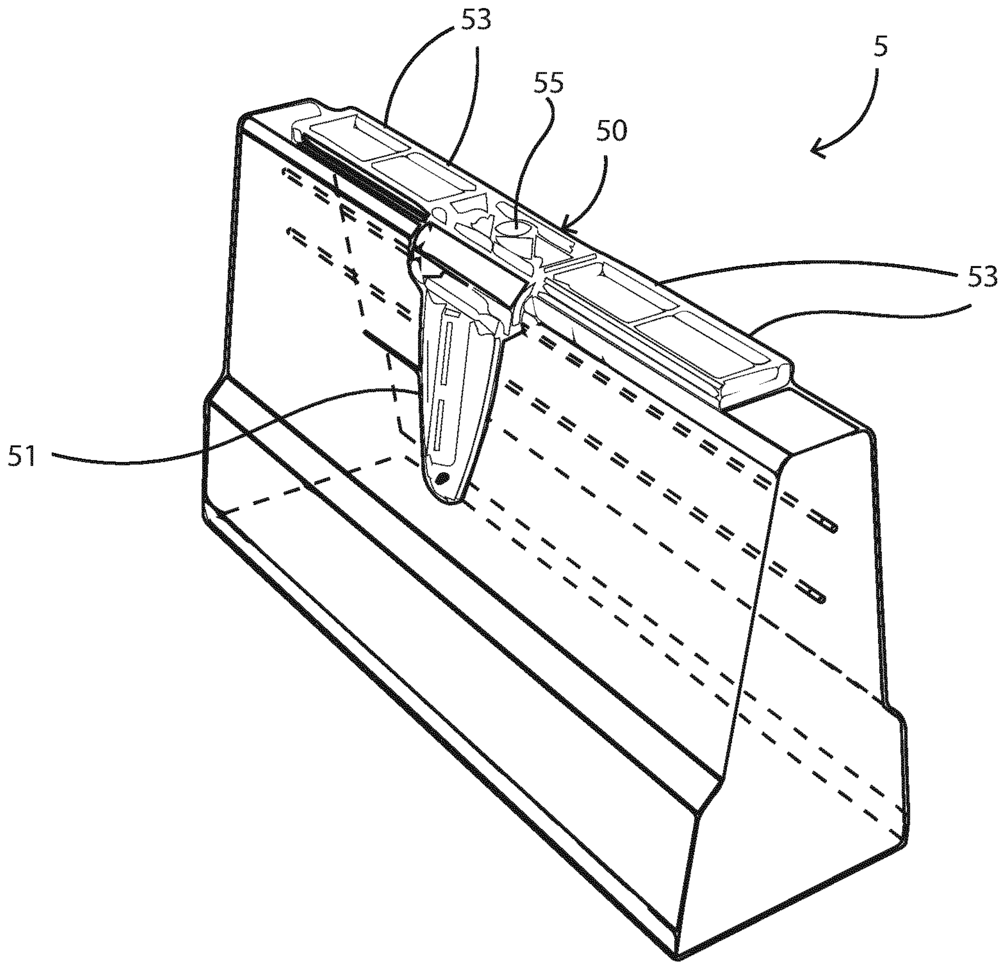
Figure 8:
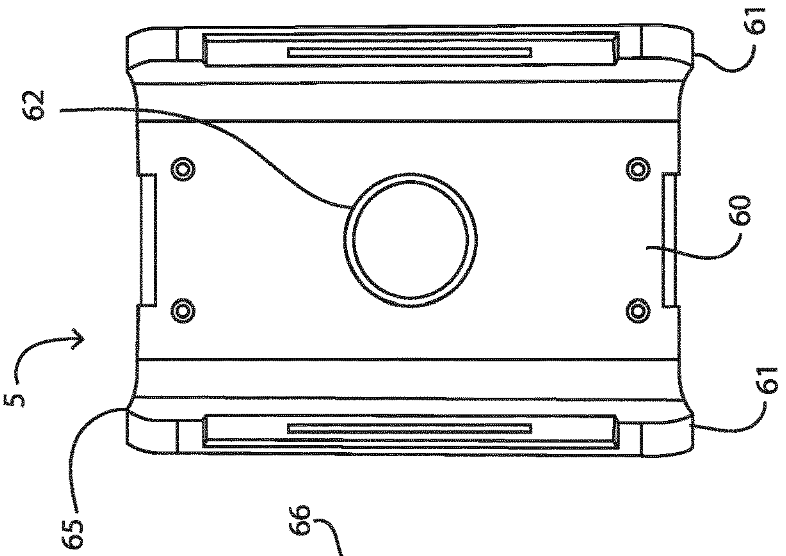
Figure 7:
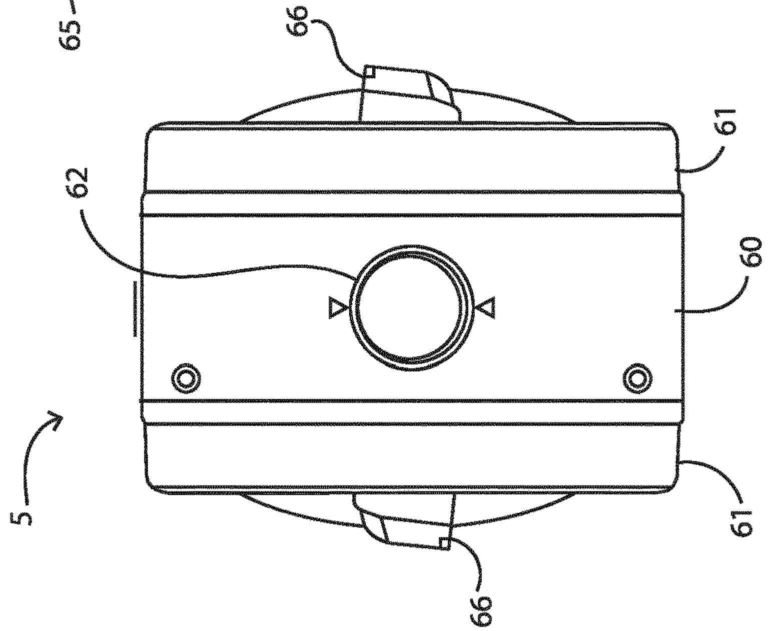
Figure 6:
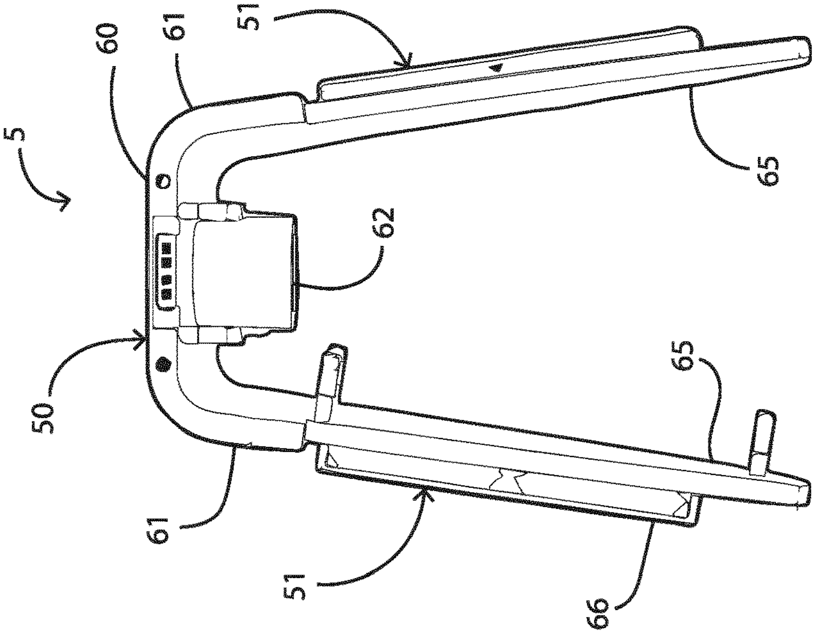
Figure 9:
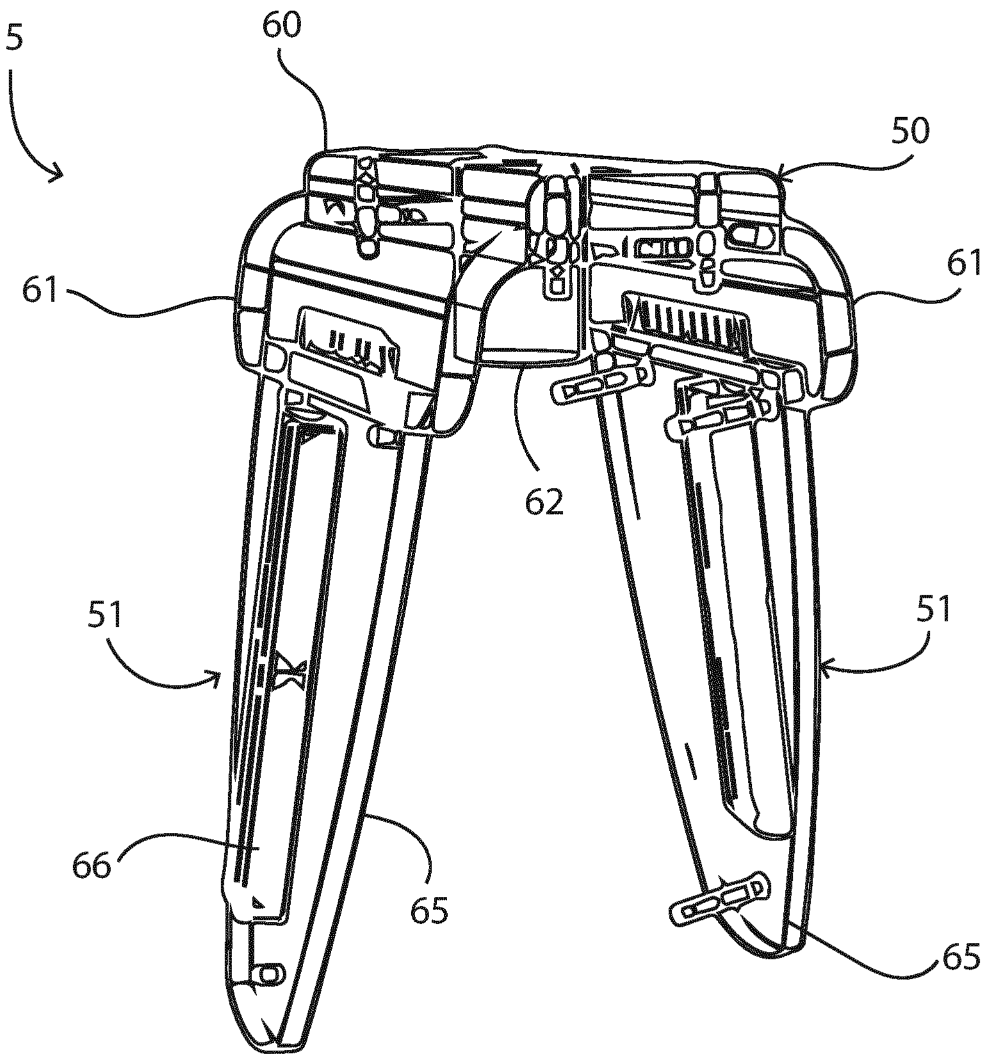
Figure 10:
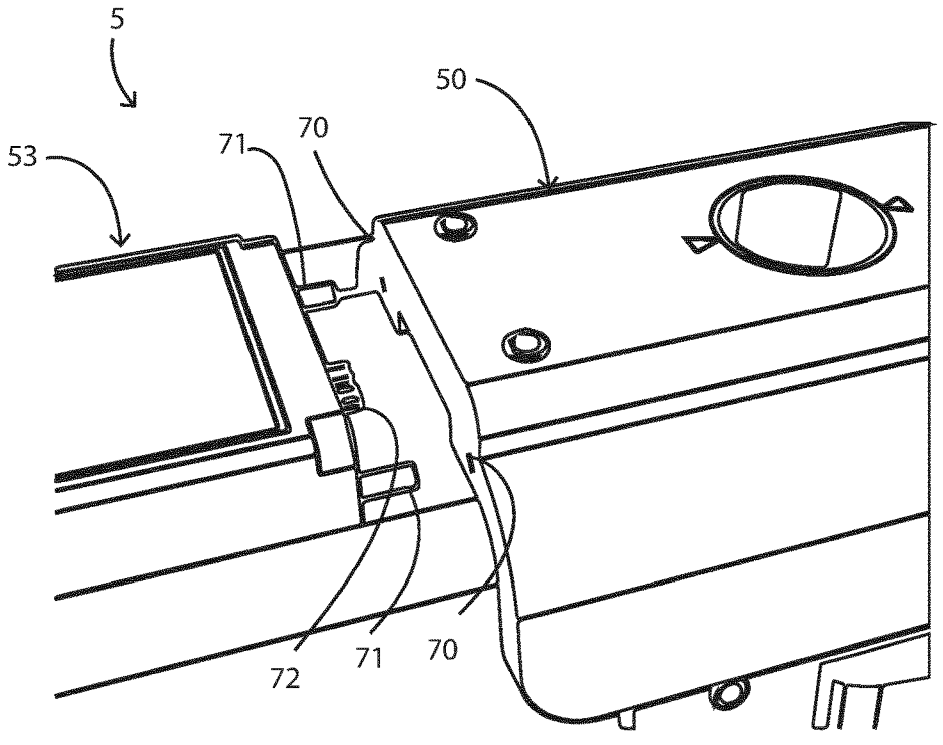
Figure 11:
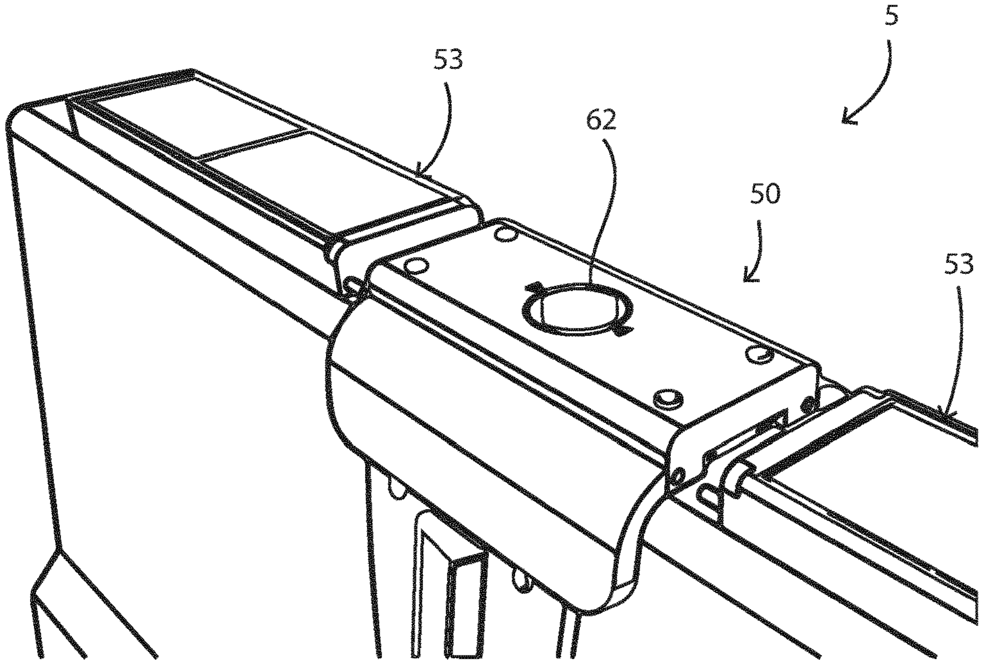
Figure 12B:
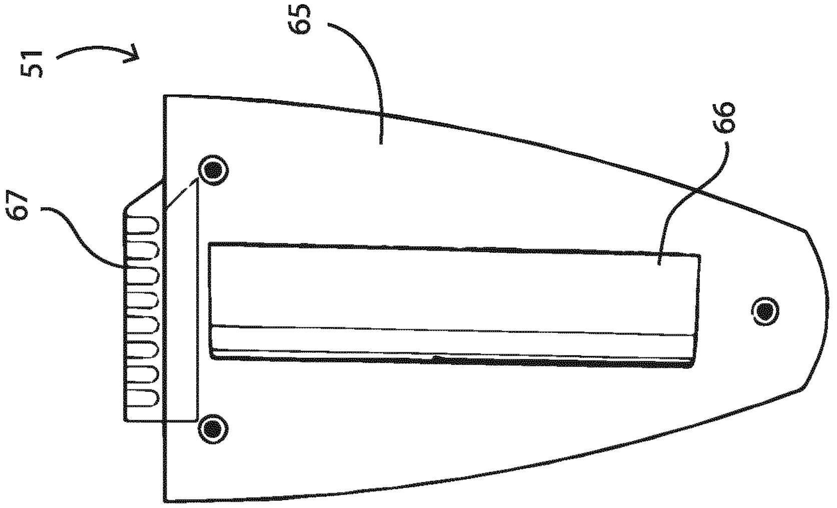
Figure 12A:
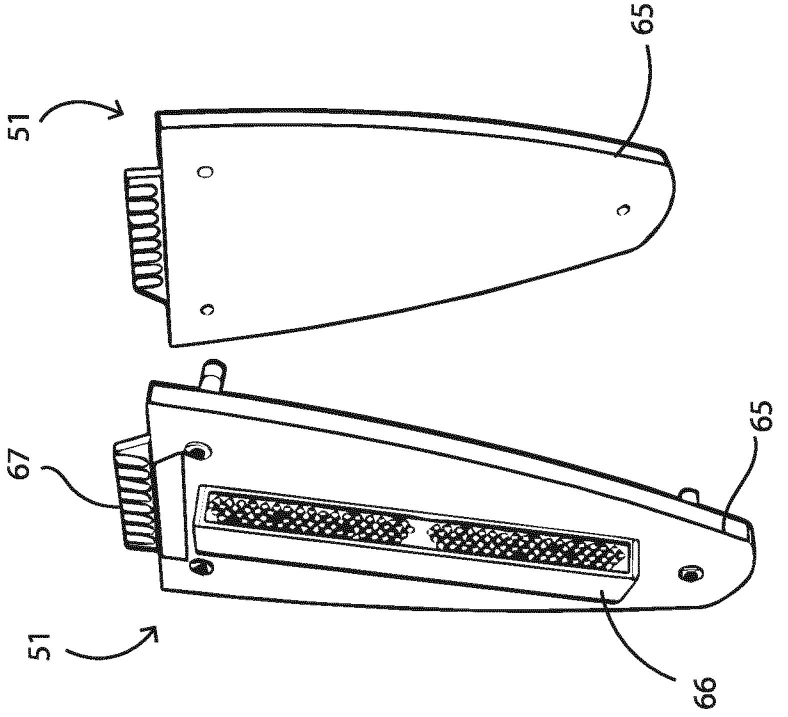
Figure 13A:
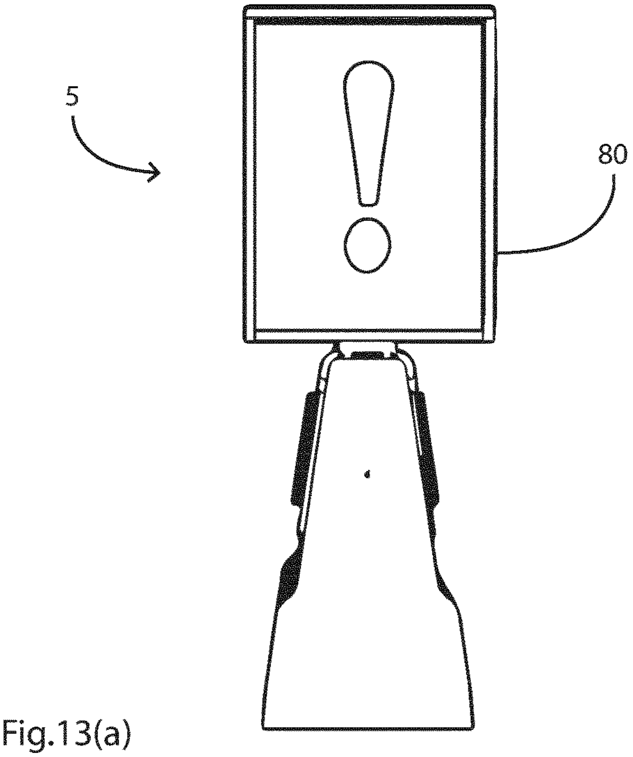
Figure 13B:
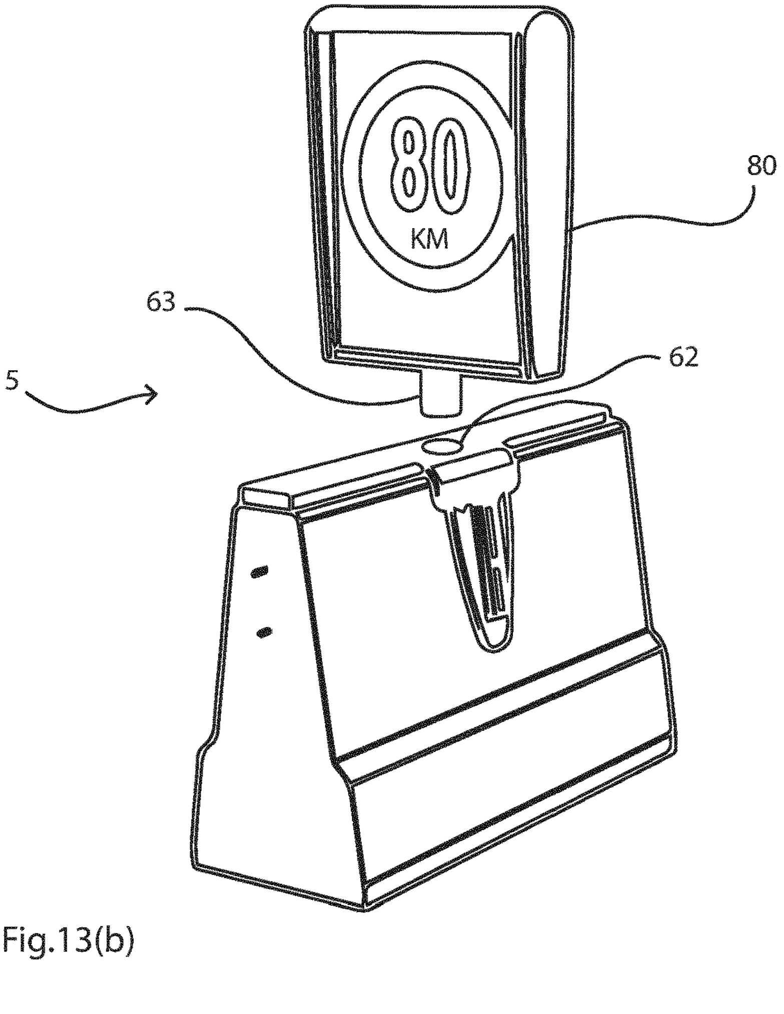
Figure 14:
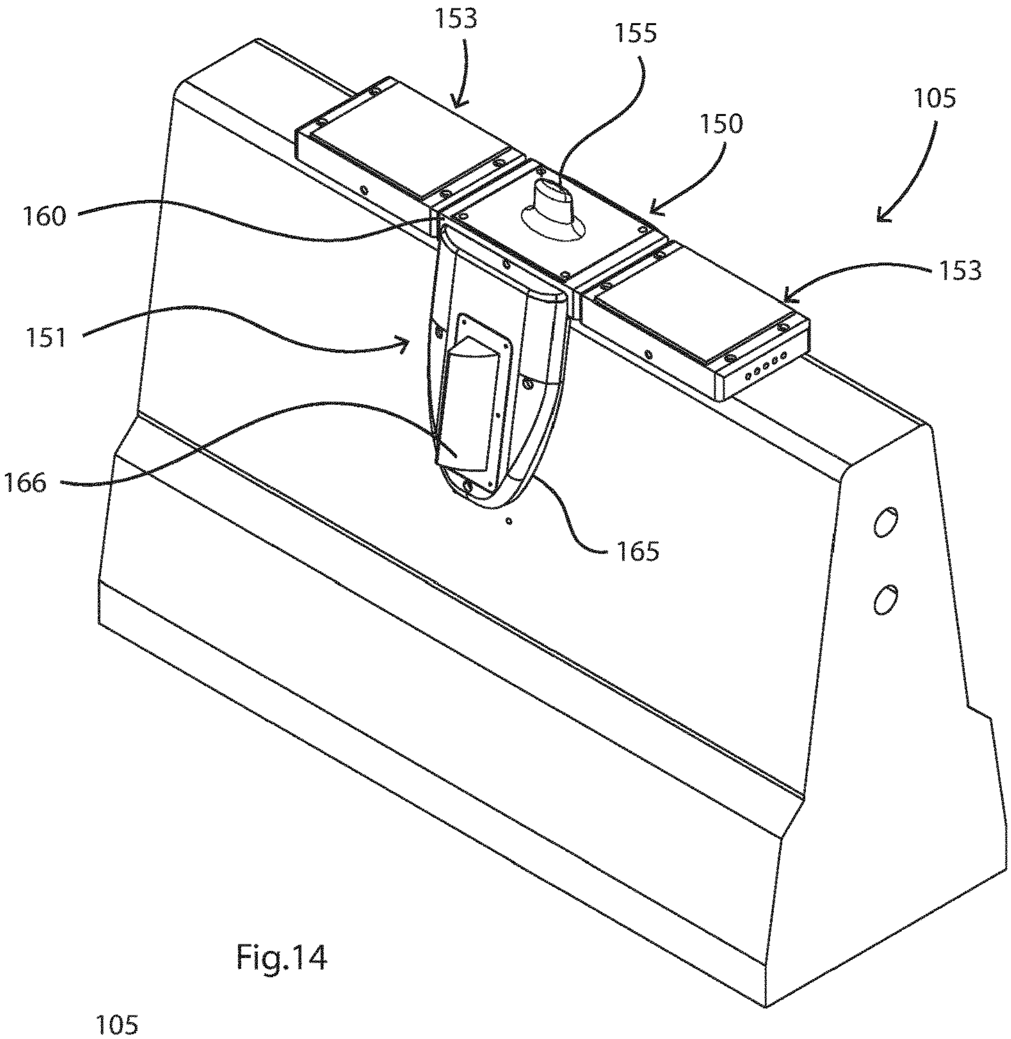
Figure 15:
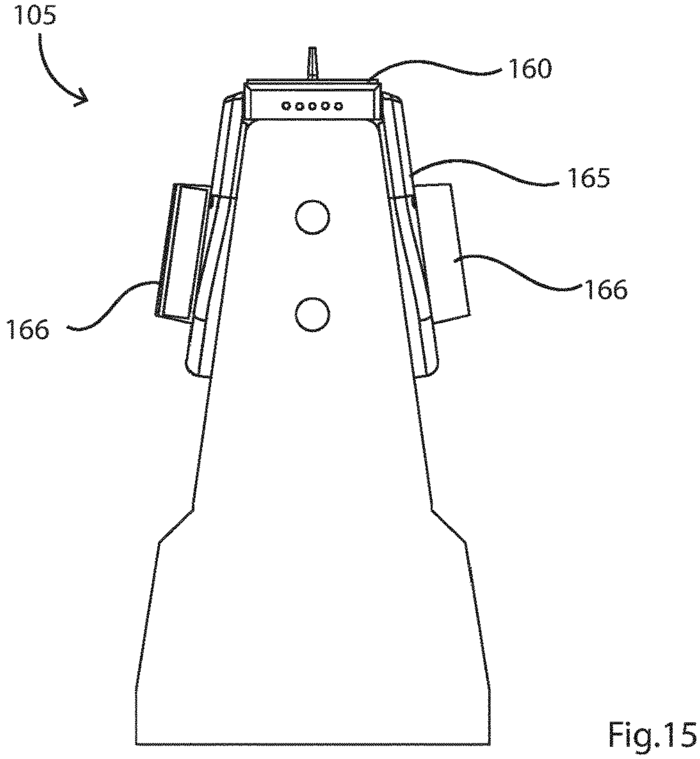
Figure 16A:
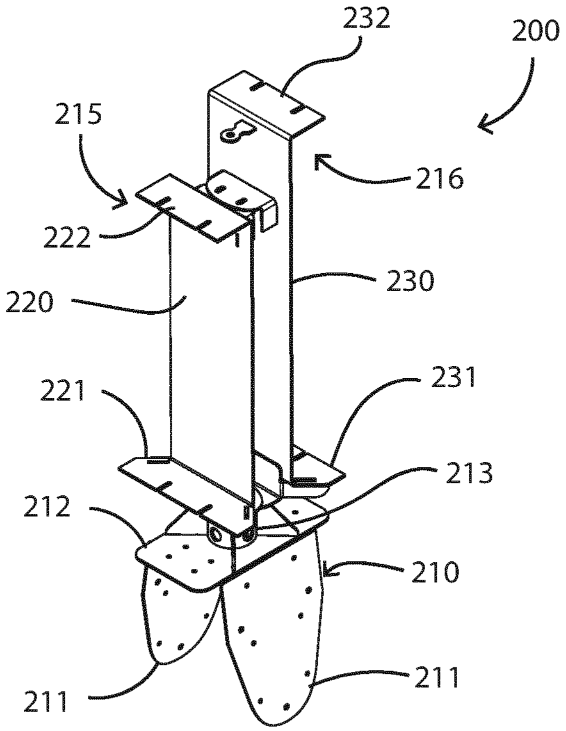
Figure 16B:
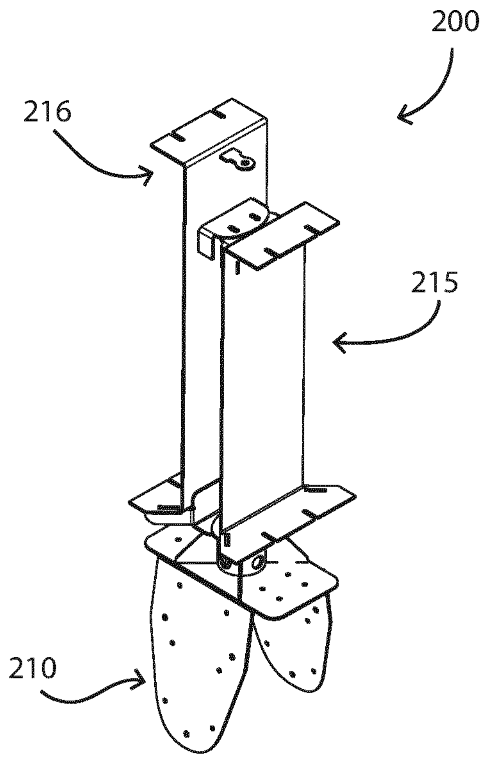
Figure 16C:
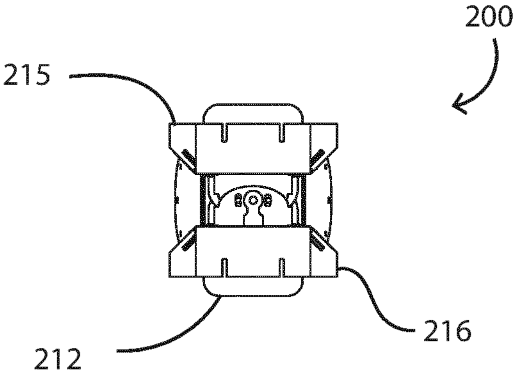
Figure 16D:
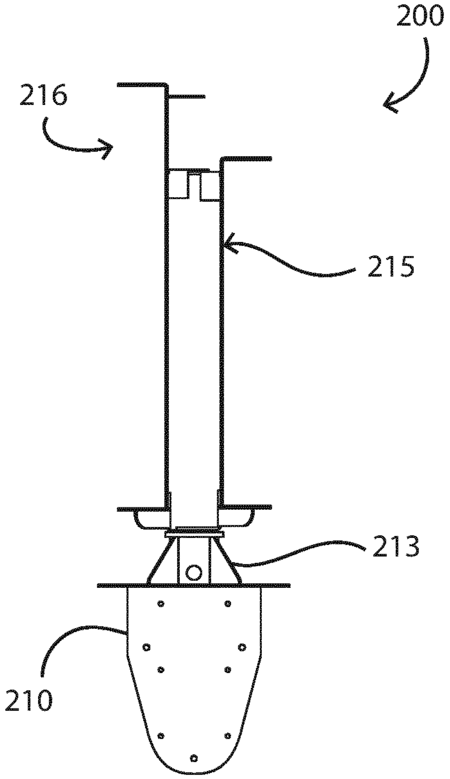
Figure 16E:
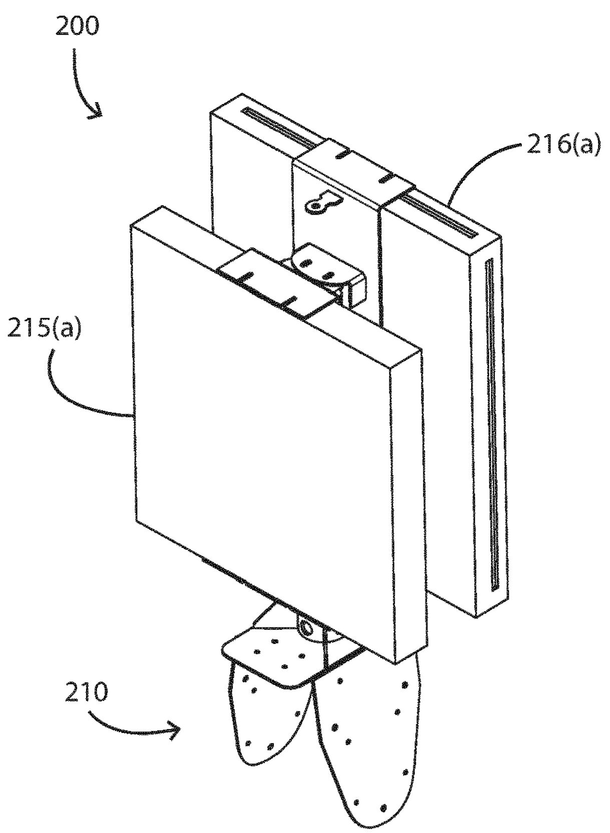
Figure 16F:
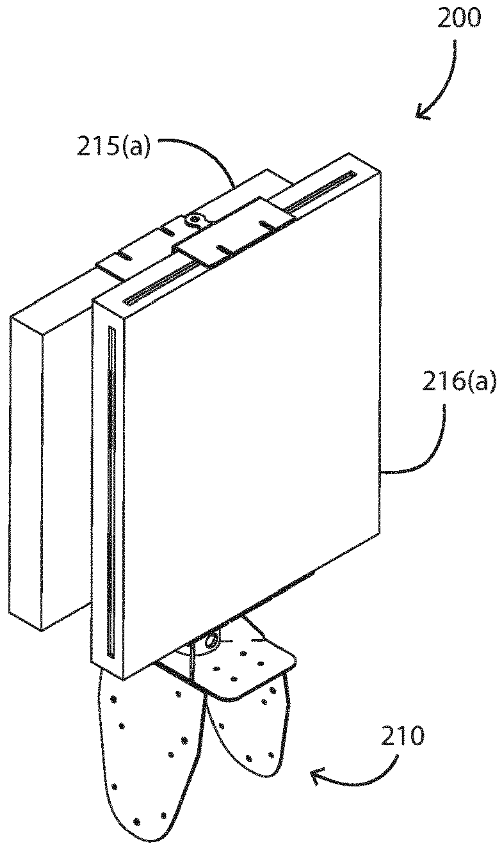
Figure 17:
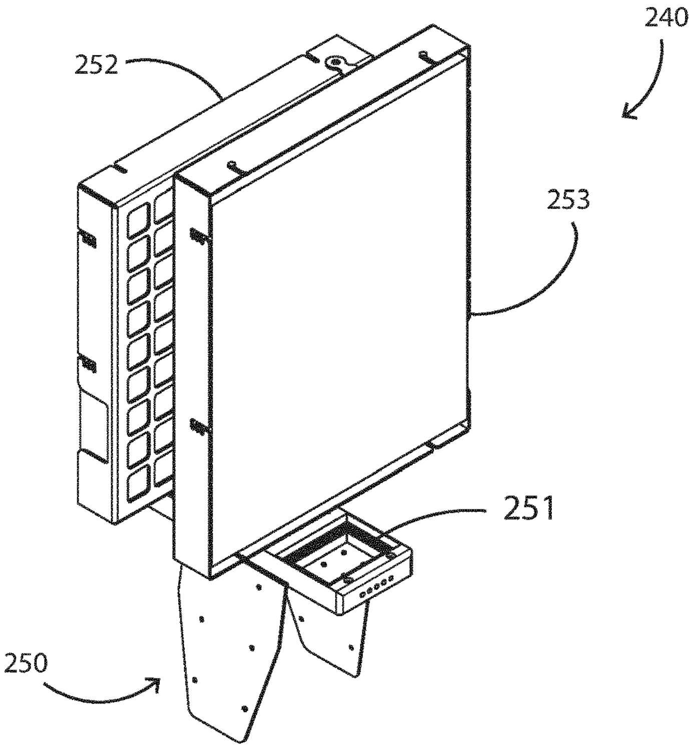
Figure 18A:
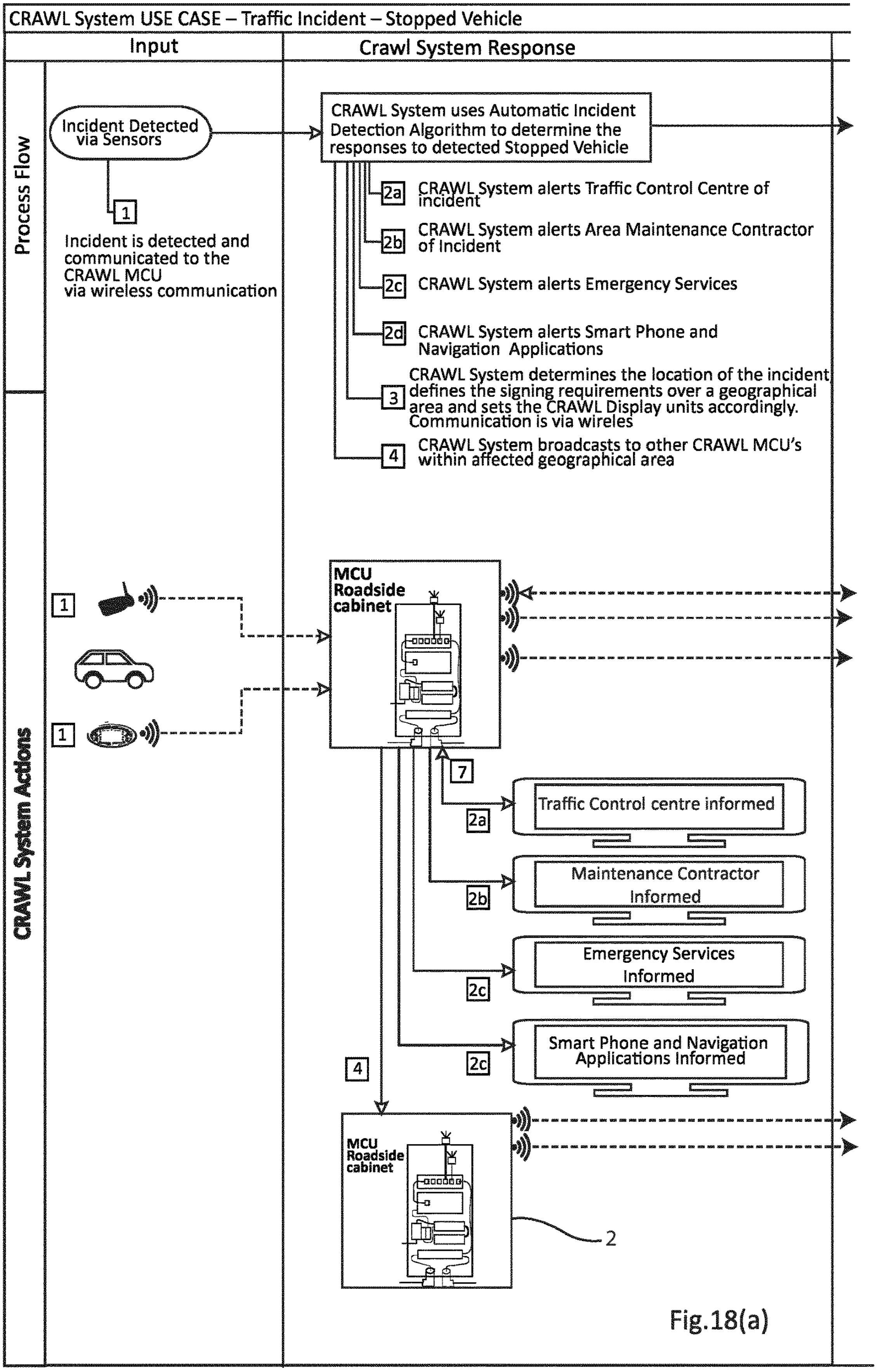
Figure 18B:
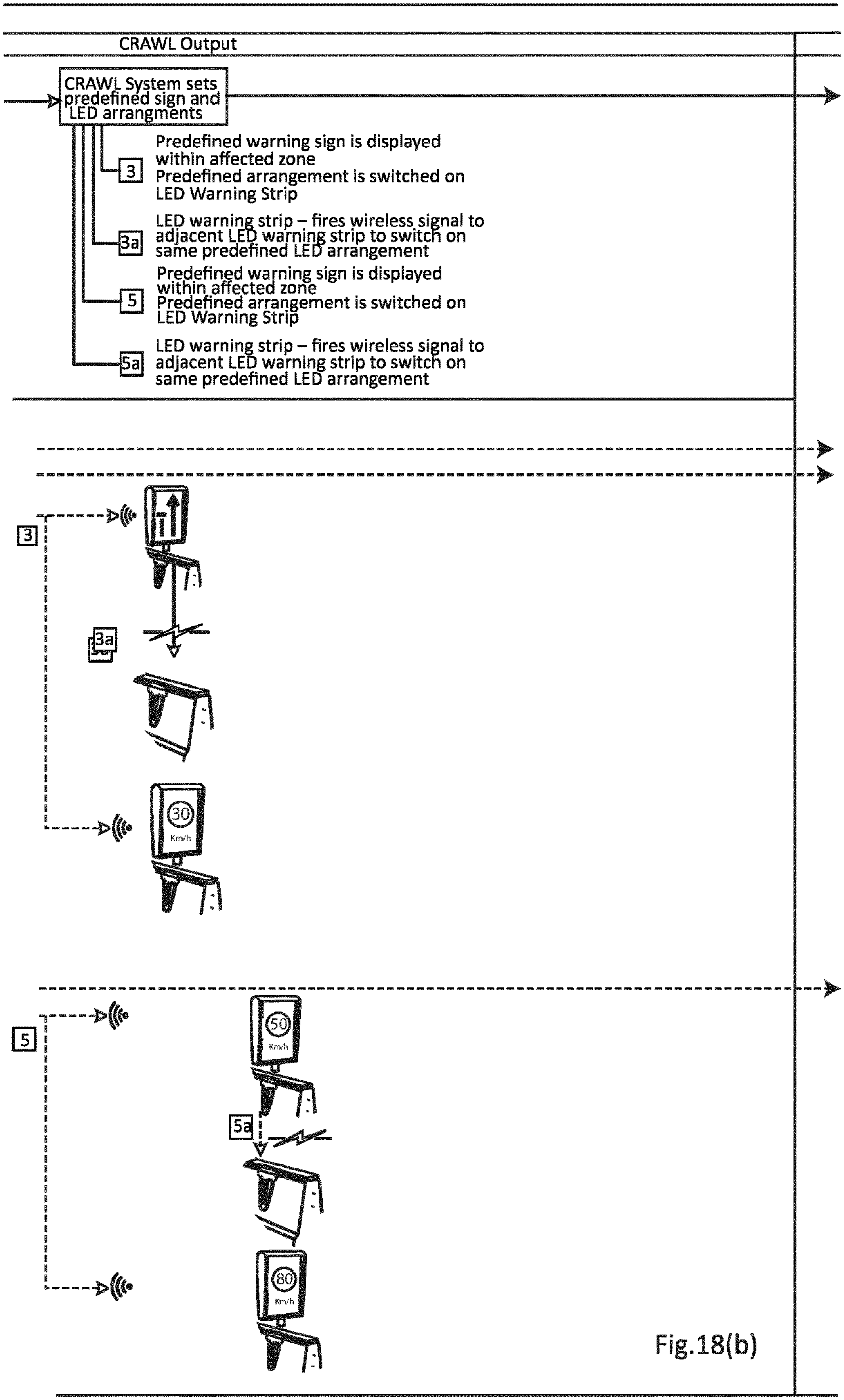
Figure 18C:
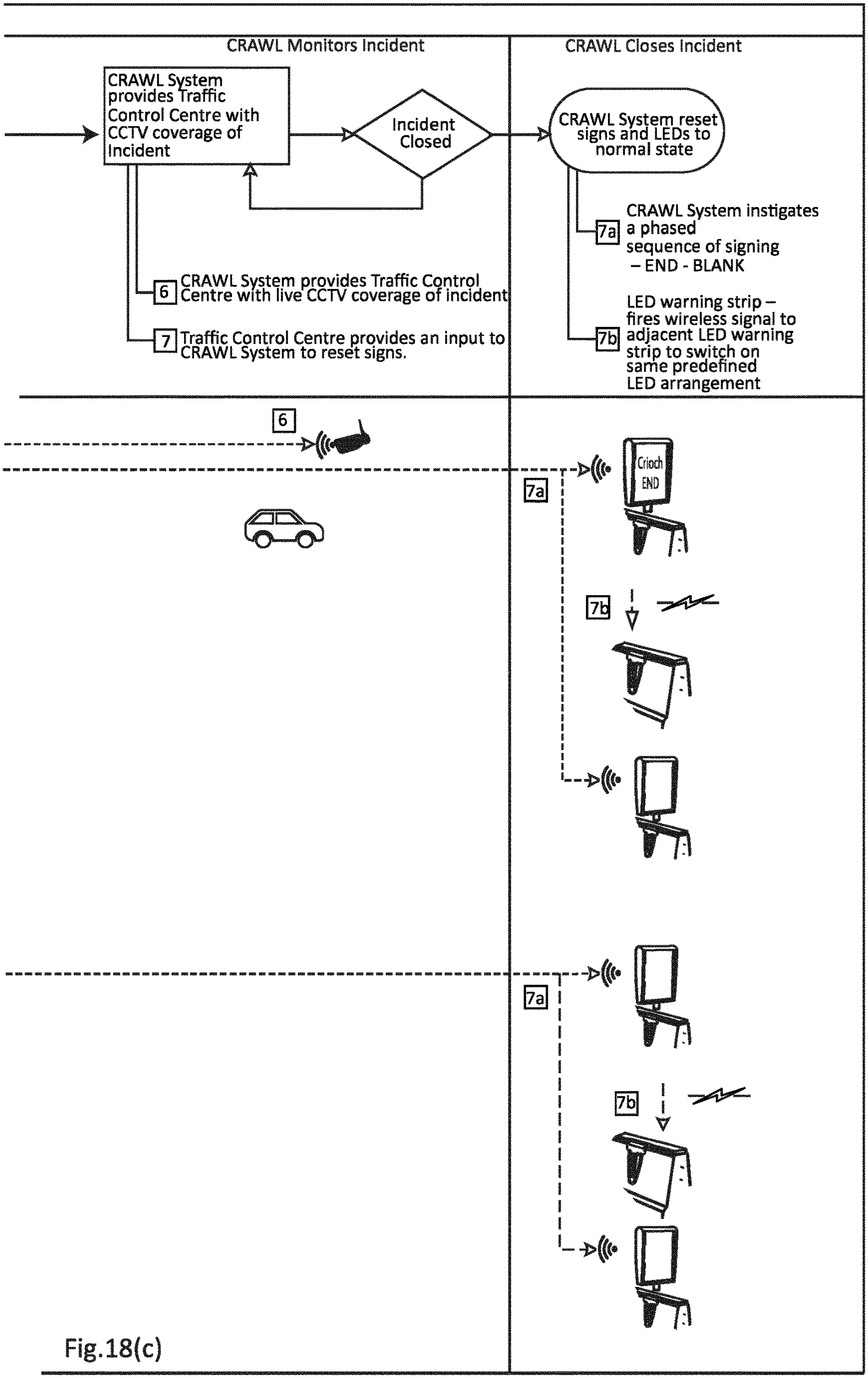
Figure 19A:
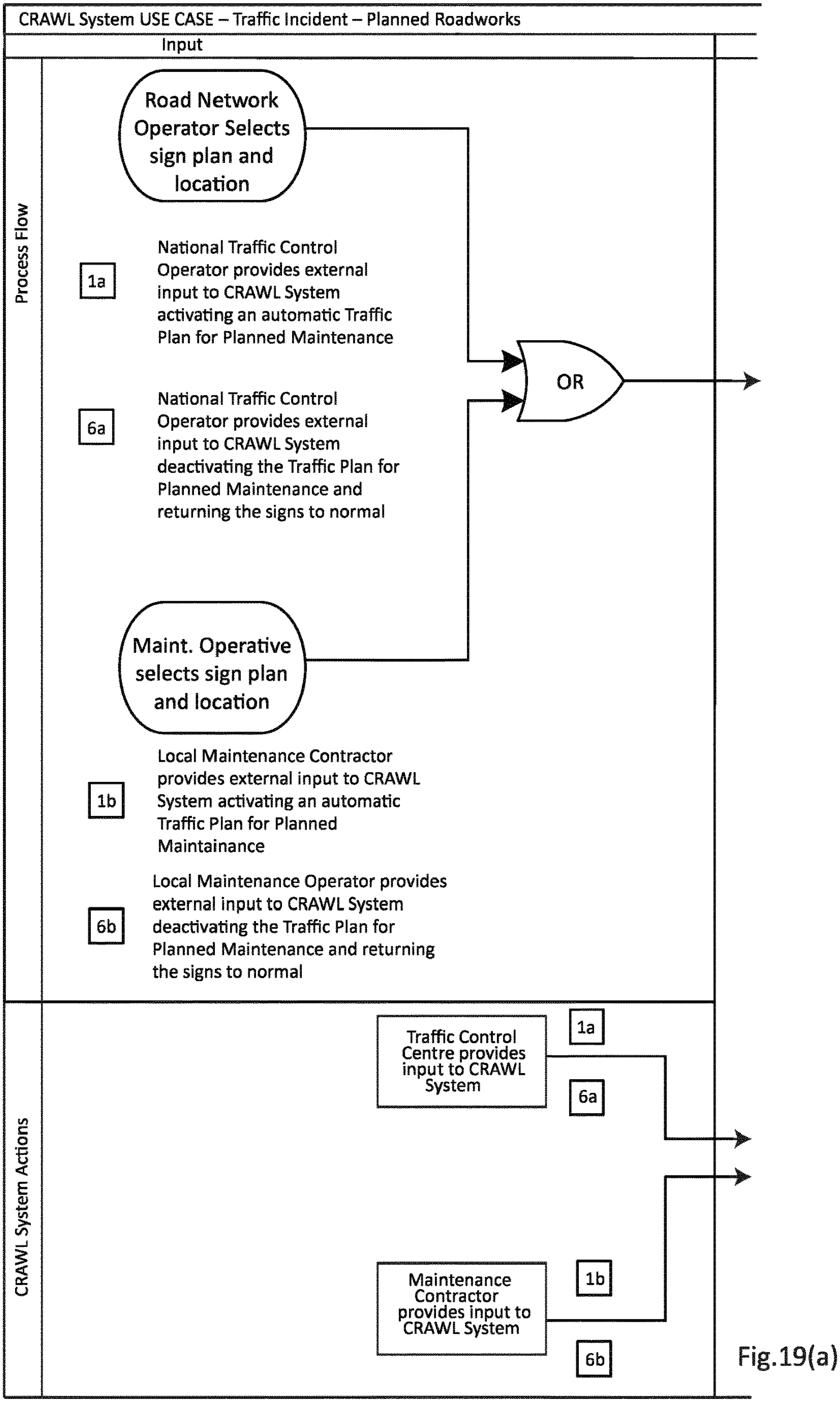
Figure 19B:
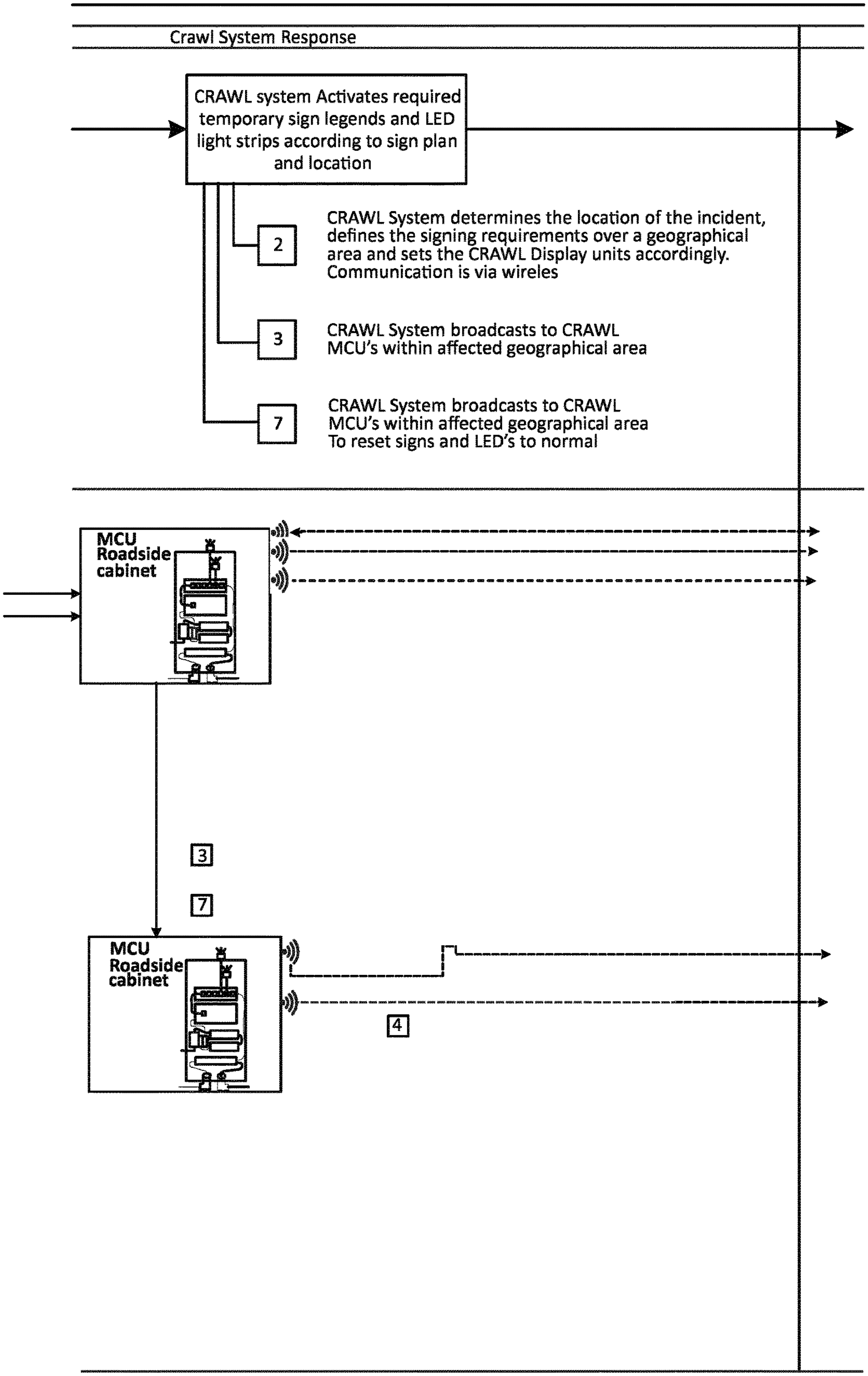
Figure 19C:
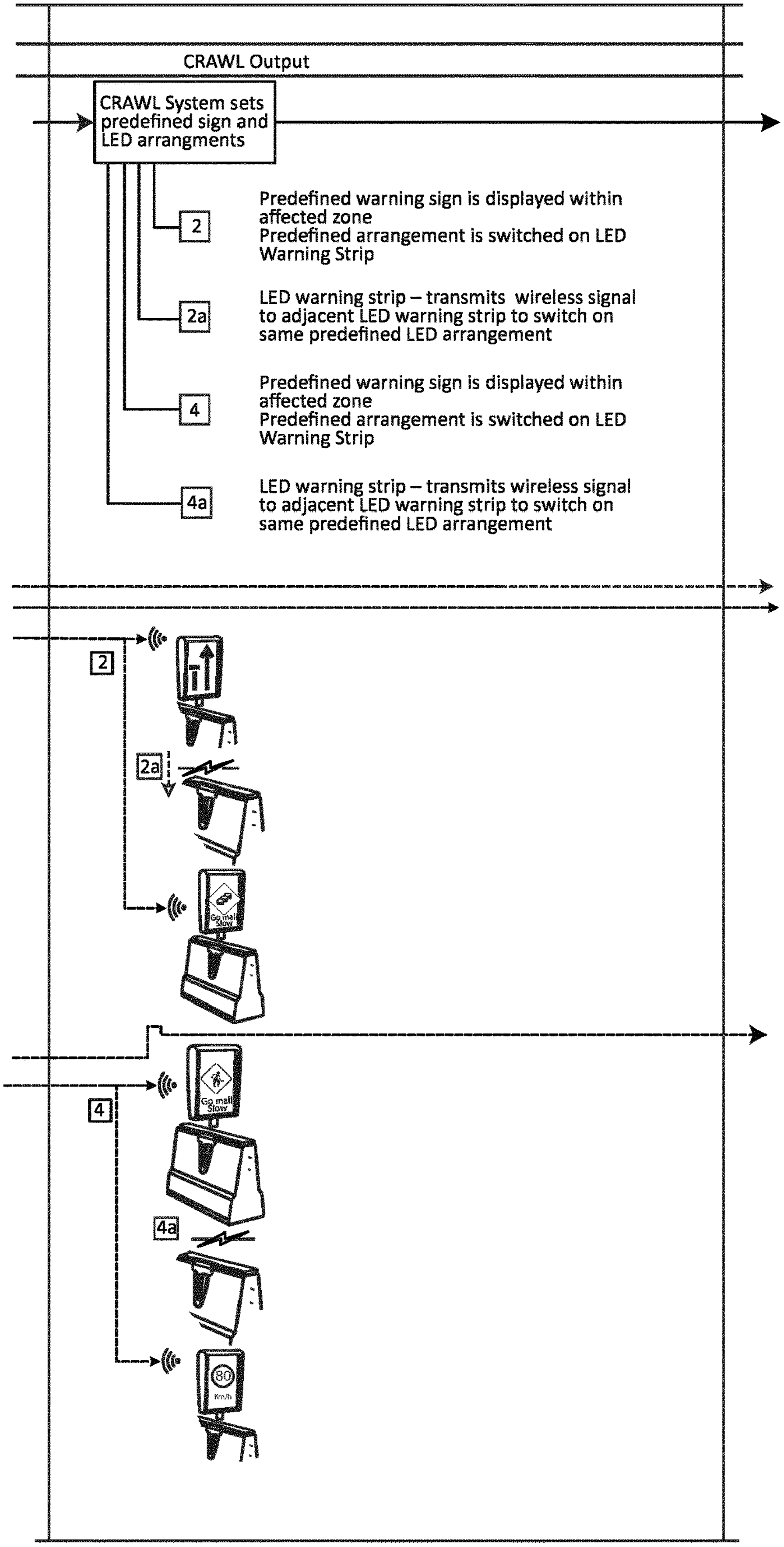
Figure 19D:
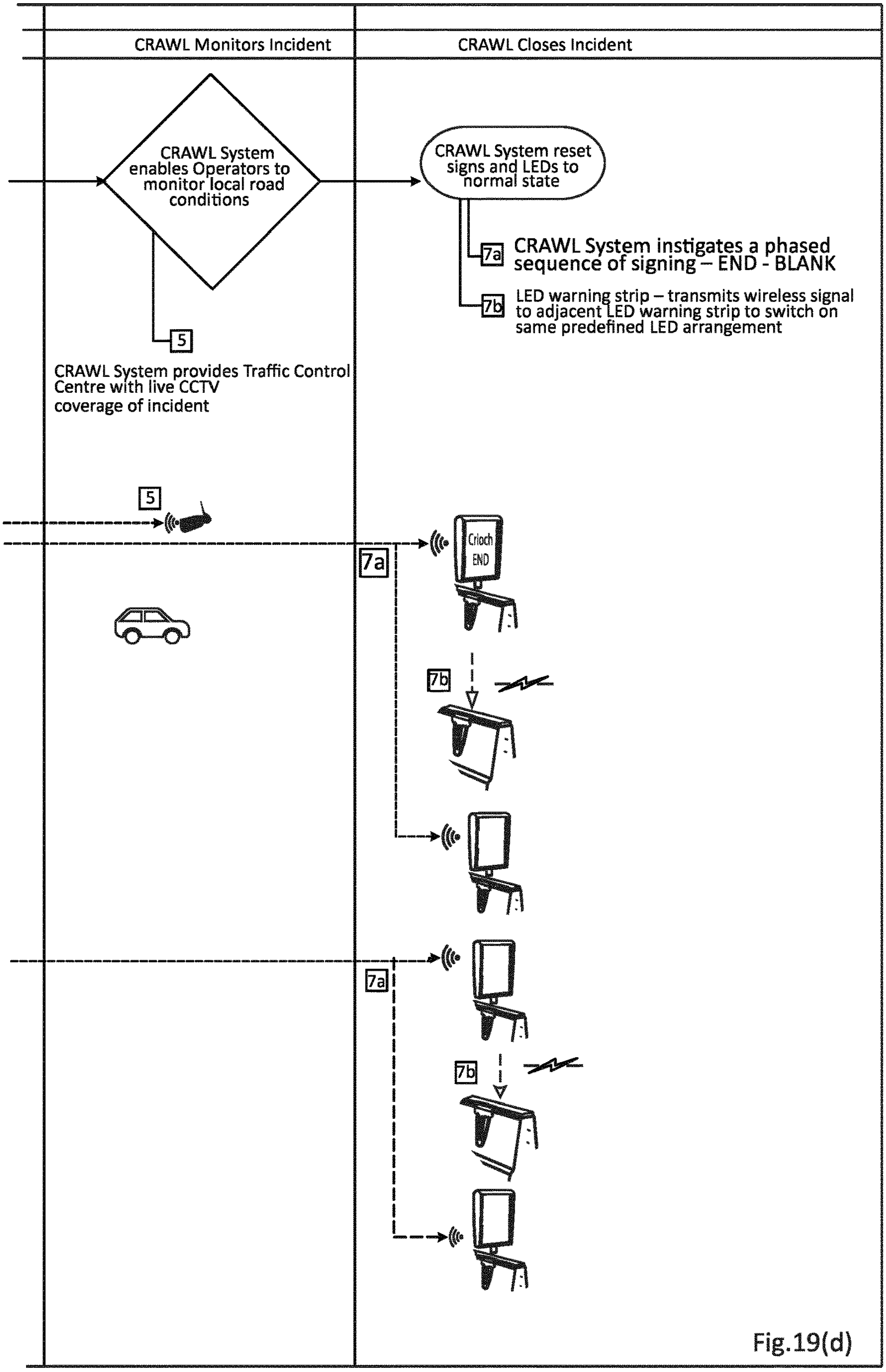
Figure 20A:
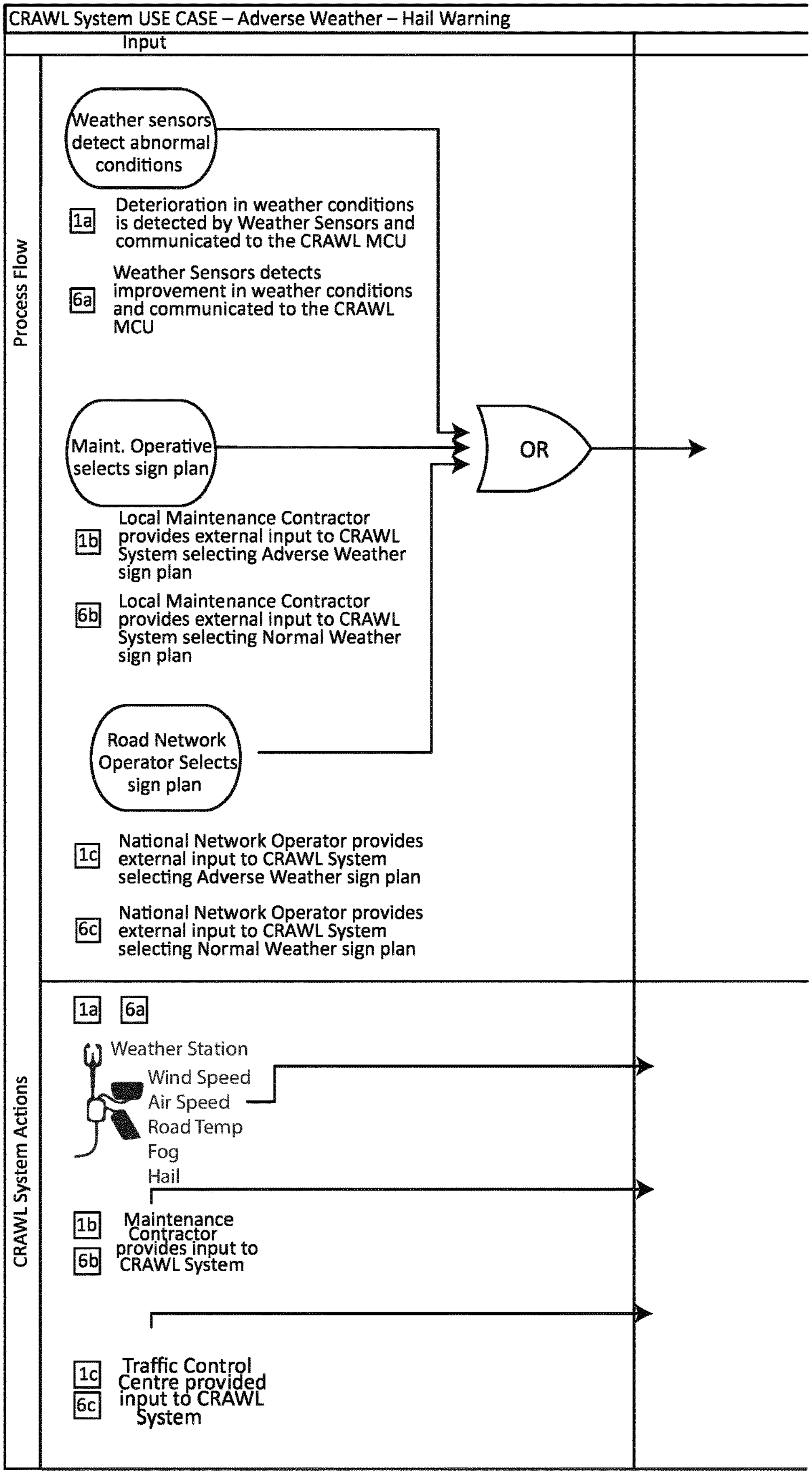
Figure 20B:
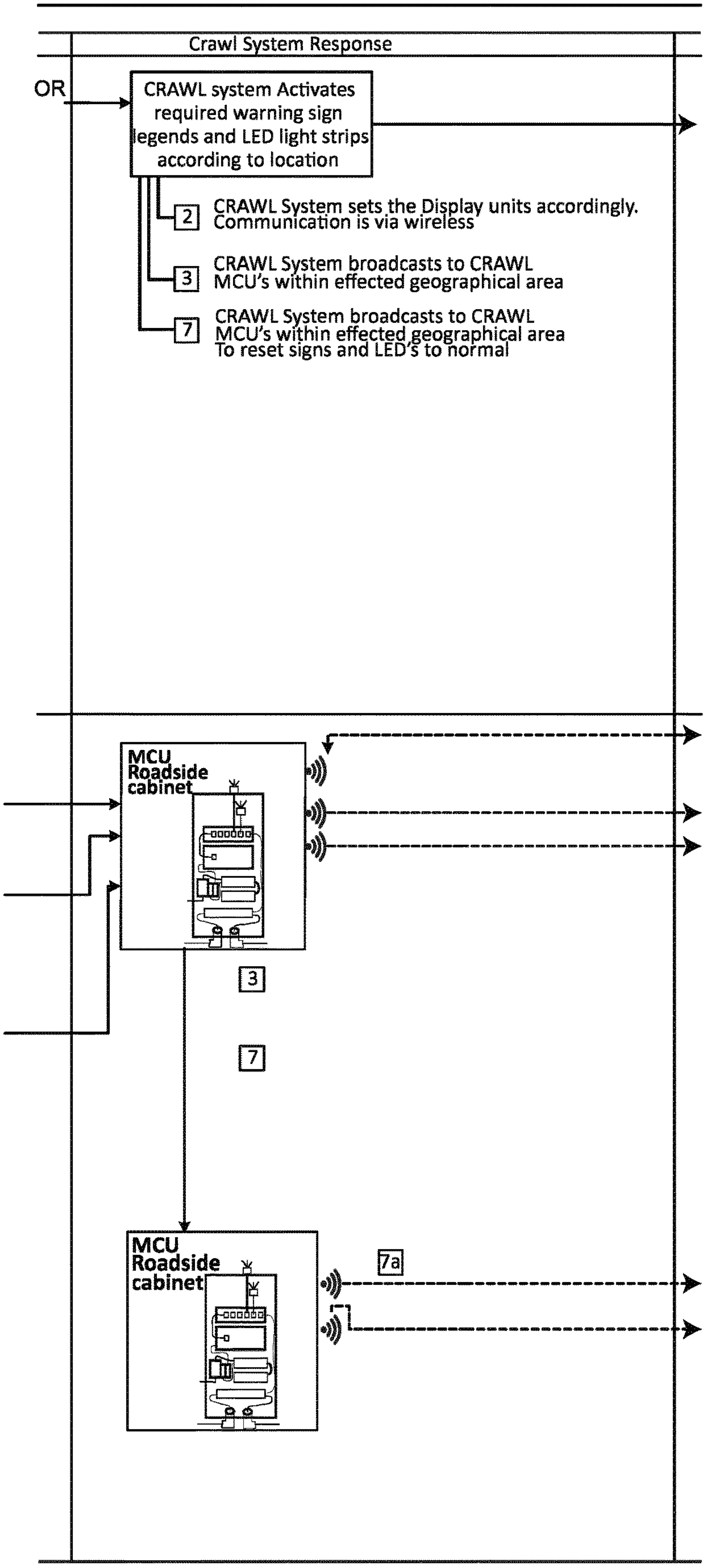
Figure 20C:
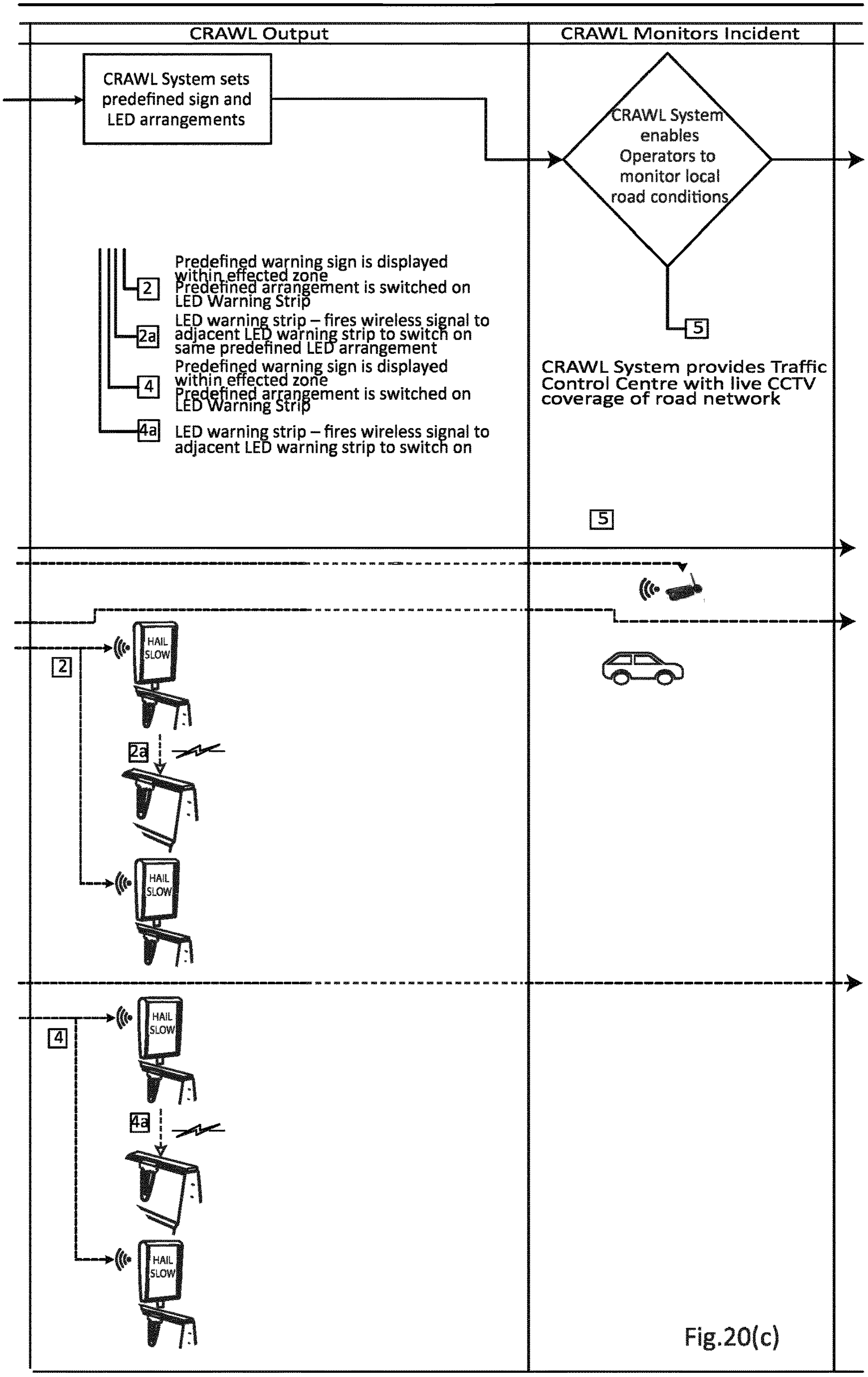
Figure 20D:
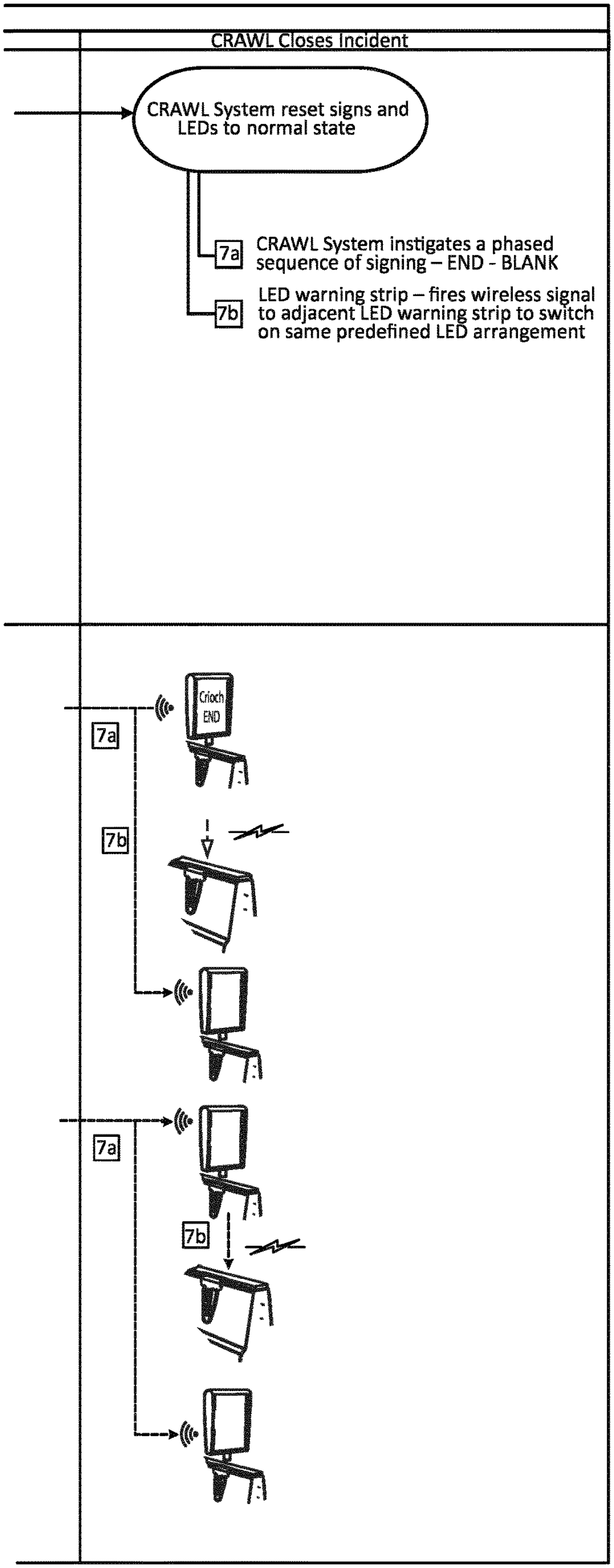
Figure 21A:
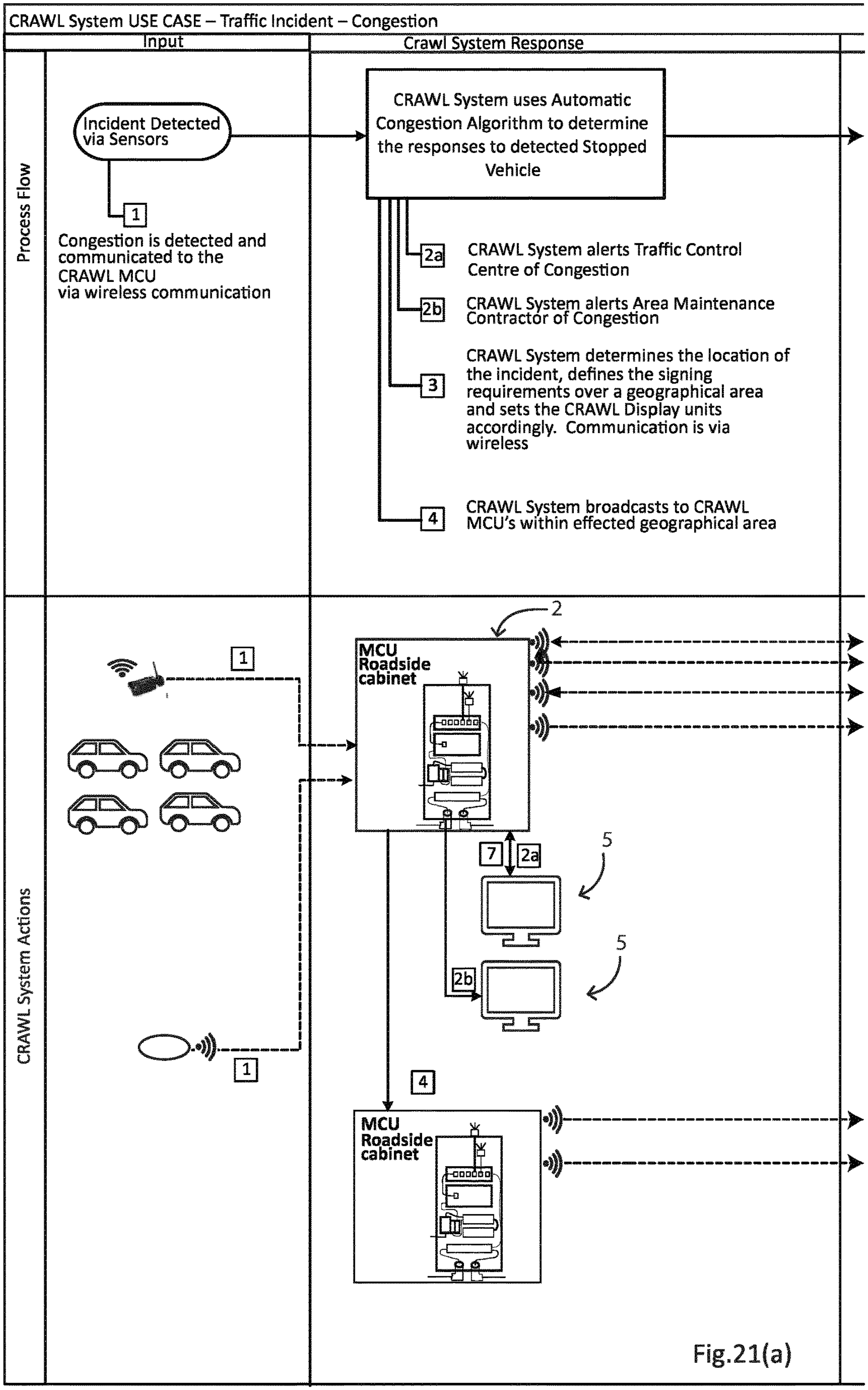
Figure 21B:
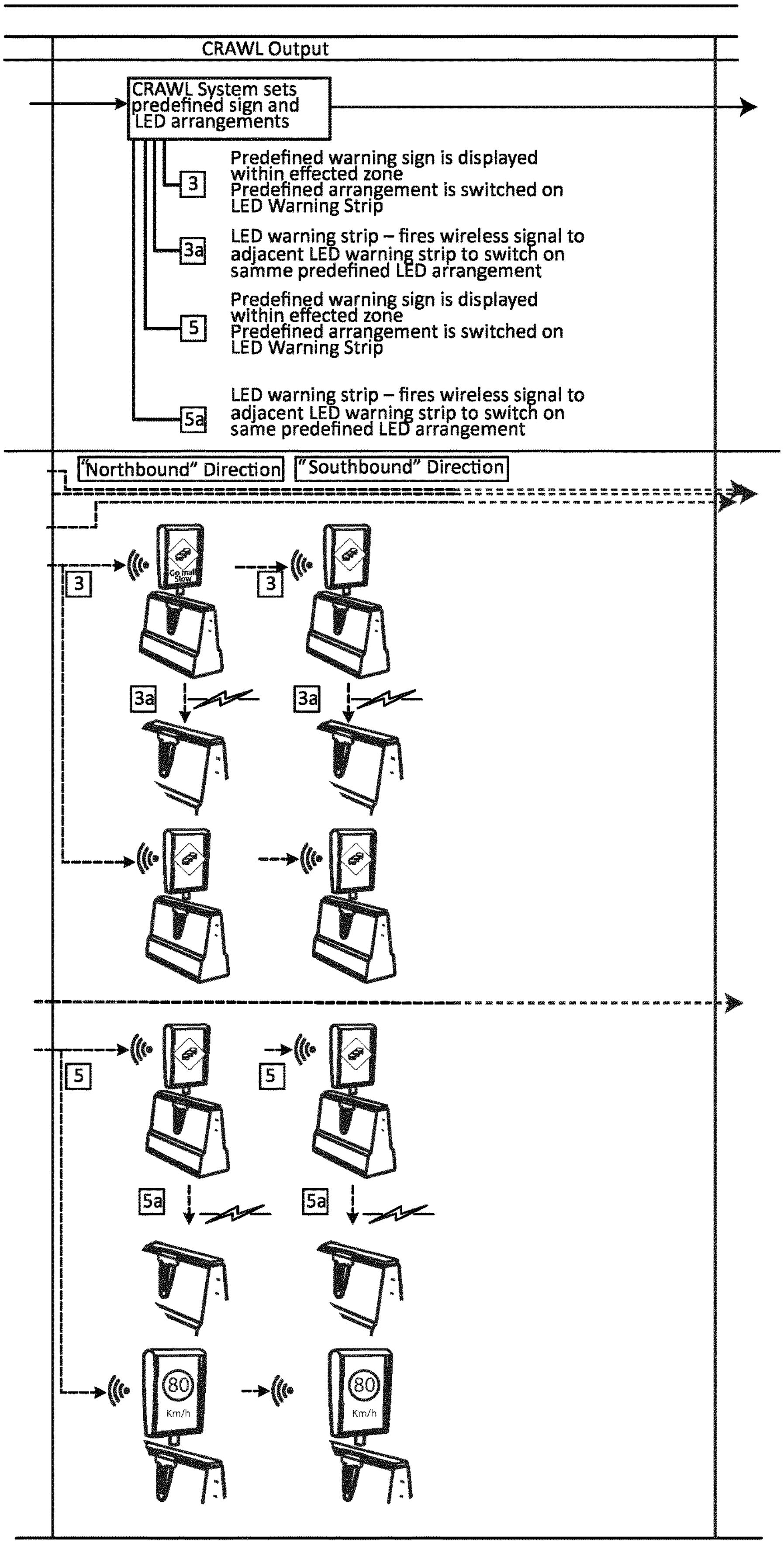
Figure 21C:
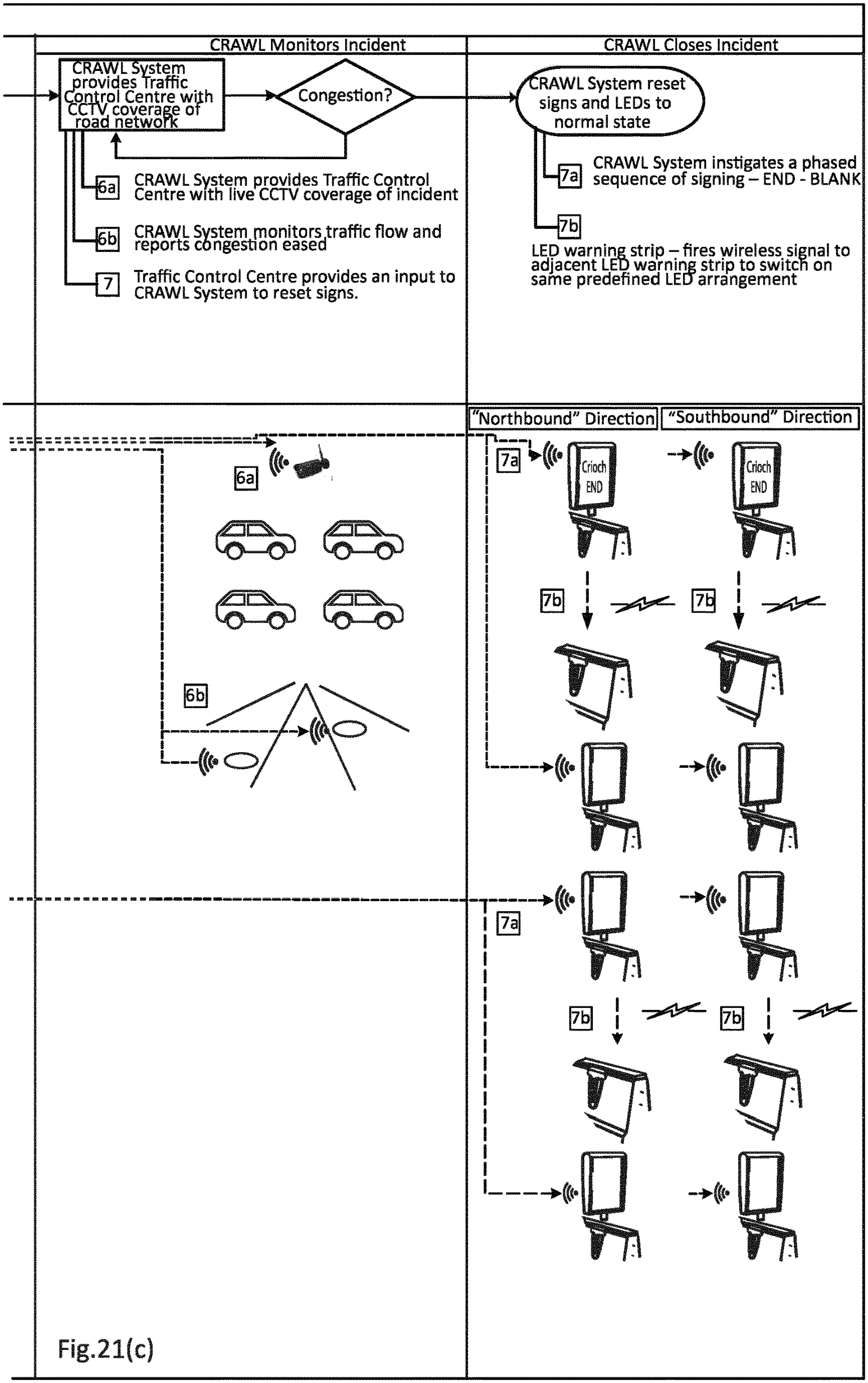

FIG. 3 is an end view showing the short-interval saddle unit mounted on a traffic divider, FIG. 4 is a perspective view of what is shown in FIG. 3, FIG. 5 is a perspective view showing the short-interval saddle unit after addition of solar panels, FIG. 6 is an underneath perspective view of the short-interval saddle unit without solar panels, showing the side which engages the traffic divider in more detail, FIGS. 7 and 8 are top and underneath plan views of the short-interval saddle unit, FIG. 9 is a perspective view showing internal parts of the short-interval saddle unit in more detail, FIGS. 10 and 11 are perspective views from different sides showing interconnection of a saddle component to solar panel components of the short-interval saddle unit, FIGS. 12(*a*) and (*b*) are views showing how lower display components of the short-interval saddle unit are connected to the saddle component, and FIGS. 13(*a*) and (*b*) are end and perspective views showing a short-interval saddle unit with an upper display component;

FIG. 14 is a perspective view of an alternative short-interval saddle unit, in this case having a protruding but streamlined RF communication antenna, and FIG. 15 is an end view of this unit;

FIGS. 16(*a*) to (*f*) inclusive are views of an alternative short-interval saddle unit, in this case having a support for electronic displays facing in both opposed directions, and in which:

FIGS. 16(*a*) and 16 (*b*) are top perspective views showing the supports for the signs in particular detail, FIG. 16(*c*) is a plan view, FIG. 16(*d*) is an end view, and FIGS. 16(*e*) and 16 (*f*) are perspective views with the displays in place;

FIG. 17 is a perspective views showing an alternative short-interval saddle unit with displays;

FIGS. 18(*a*), (*b*), and (*c*) are together a flow diagram for operation of the system in response to a traffic incident caused by a stopped vehicle;

FIGS. 19(*a*), (*b*), (*c*), and (*d*) are together a flow diagram for operation of the system in response to planned road works;

FIGS. 20(*a*), (*b*), (*c*), and (*d*) are together a flow diagram for operation of the system in response to a hail warning; and FIGS. 21(*a*), (*b*), and (*c*) are together a flow diagram for operation of the system in response to traffic congestion, and in general the system can accommodate different use cases depending on the circumstances.

OVERVIEW

Figure 1:
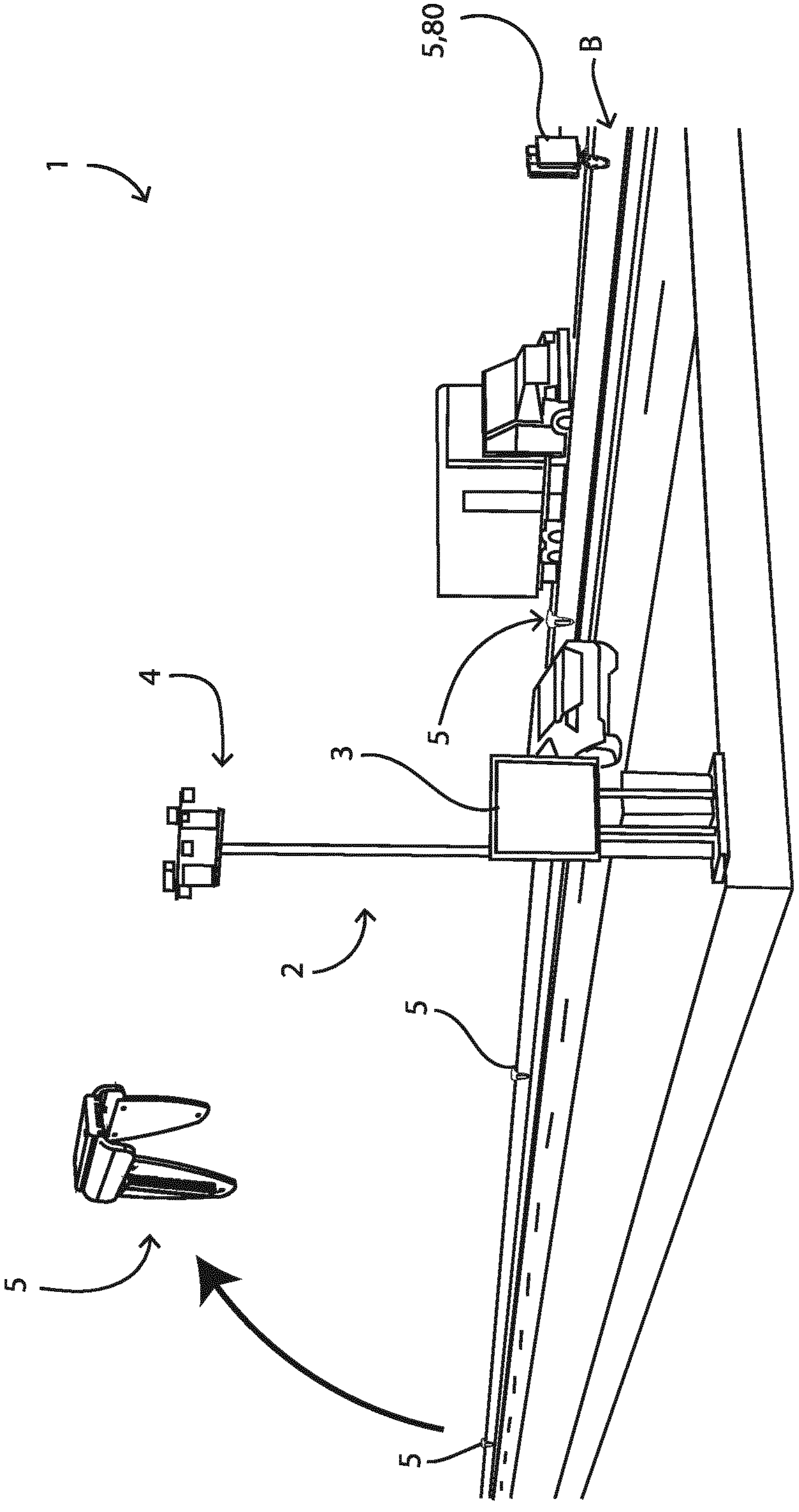
FIG. 1 is a perspective view of components of an information system which are at one particular location adjacent a motorway, FIGS. 2(*a*) and 2(*b*) are diagrams illustrating the system of FIG. 1 in more detail, FIG. 2(*c*) is a diagram illustrating the architecture of a master control unit (MCU), and FIG. 2(*d*) is a diagram illustrating aspects of the system architecture.

Referring to FIG. 1, and FIGS. 2(*a*) to (*d*) in various examples we describe a system 1 ("CRAWL") for providing real time comprehensive information to drivers on busy roads such as motorways and dual carriageways.

The system 1 comprises autonomous master control units (MCUs) 2 which monitor the road and weather conditions in real time and generate display warnings to upstream motorists. They can do this without instruction from a remote host or server and can provide a very fast response time to changing local conditions in terms of traffic or weather. The master control units 2 can also transmit data and receive commands from a remote host, but they do not need such instruction in order to generate real time upstream driver warnings. The separation of MCUs in generally in the order of kilometers.

The system also comprises short-interval "saddle" units 5 which are located along the central reservation or verge with a high density, and each has a display with light sources such as an array of LEDs. This is alternatively referred to as a "warning strip" in the use examples given below. They are activated so that a sequence of them in a linear pattern together convey a message to a driver as he or she drives on the road. It is preferable that the short-interval saddle units are mounted with a separation in the region of only 100 m apart, and more generally preferably in the range of 30 m to 1 km apart, more preferably 50 m to 500 m. The short-interval saddle units are preferably mounted in a central reservation, and preferably on a continuous barrier. With such short intervals they convey information without a written message required to be read by a driver, but rather simple warnings due to the colour, and/or intensity, and/or blinking frequency of their light sources.

The units 5 are referred to as "short-interval saddle" units because they have a saddle-shaped housing to fit to the top of a central reservation barrier. It will be appreciated however that at least some short-interval units may not be so configured, possibly being post-mounted for example.

The master control units 2 communicate with other master control units 2 and with short-interval saddle units 5. Depending on configuration settings, clusters of short-interval saddle units 5 are associated as groups with MCUs 2, and indeed some saddle units are in multiple clusters. There is versatility to configure groups according to road and environmental conditions. Advantageously, each MCU operates with a cluster of saddle units 5 in a cohesive manner to provide warning and/or instruction to drivers in the optimum manner according to the local conditions. At a purely communication level MCUs can communicate with any number of MCUs, and of course with remote servers.

Importantly, the short-interval saddle units 5 are mounted at approximately driver eye level, avoiding need for a driver to focus on anything but the road ahead. This low level is achieved in some examples by the units 5 being mounted on a barrier along the side of a road or carriageway of a road, such as a central reservation barrier. Advantageously, in at least some examples, the short-interval saddle units have a saddle for low-profile fitting to the top of a barrier such as a concrete barrier which runs in the central reservation between the two sides of a dual carriageway. This way, each short-interval saddle unit can provide a display on both sides of the dual carriageway. As shown in FIG. 1(*a*) some short-interval saddle units have a display screen 80 for providing additional information. The display screens 80 may be provided at any desired frequency such as every fifth unit 5 as shown in FIG. 2(*a*). Where short-interval saddle units are mounted on a barrier, the barrier may be of the concrete construction illustrated in the drawings, or it may alternatively be in the form of a metal fence. It is generally preferred that the light sources are approximately at the level of a driver of a car, in the range of 0.5 to 1.5 meters above ground.

The master control units (MCUs) on the other hand may have display screens 3 with an ability to display a range of messages, and in a manner which typically does require a small extent of reading by the drivers. They are preferably located on the road verges, not in the central reservation. The MCU display screens 3 display a message as defined by the system and complementary to the message's displayed on the short interval saddle unit display. The sensors are selected from known sensors for weather conditions, road conditions, and vehicle detectors as described in more detail below.

In more detail, the MCUs 2 are mounted on each verge with, in one example, 2 km spacings on each side. There is a 1 km offset from one side to the other across the opposed verges so that the spacing (as shown in FIG. 2(*a*)) is only about 1 km. Most MCUs 2 have a display screen 3, and processors in the MCU are linked with condition sensors (not shown) and cameras 4 in any desired configuration.

In one example, as shown in FIG. 2(*b*) the system 1 has multiple local area networks (LANs) each having a cluster of MCUs 2, short-interval saddle units 5, and condition sensors. Each LAN is interconnected over a wide area network with servers including for example servers of a national traffic control centre. In general, it is advantageous that the units which are spaced at longer intervals, the MCUs, have greater processing capability and coordinate data they receive both locally and remotely via the local and wide area networks.

The following are three preferred examples of numbers of short-interval saddle units for a motorway section of 1 km, and MCU spacings of 1 km. This table illustrates that the density of short-interval saddle units may be chosen according to the local road situation, with for example a greater density (shorter intervals) where the road bends.

| Short Interval Units 5 | Short Interval Units with Display Screen 80 | MCU 2 |
|---|---|---|
| 8 | 1 | 1 |
| 6 | 1 | 1 |
| 2 | 1 | 1 |

Short Interval Saddle Units 5

Referring to FIGS. 3 to 13, each short-interval saddle unit 5 has a saddle frame 50 which fits to the top of the central reservation barrier B. The saddle frame 50 can fit in a modular manner to any desired configuration of components to suit the location. These components include a lower display component 51 extending downwardly on each lateral side. As noted above, some of the units 5 also have an upper display screen component 80.

Stability for each unit 5 is provided by the saddle frame 50 having a top housing 60 and side flanges 61 together configured to envelope the top surface of a barrier B, to which it is bolted. This provides physical support in a robust manner and provides a core to which modular components may be attached including solar panel components 53 for power independence, the lower display components 51, and an upper display screen 80. The latter may be mounted by a spigot 63 into a socket 62 of the saddle top housing 60. The saddle arrangement allows the unit 5 to have a low profile and to be very securely attached to the barrier B, and it also allows addition of solar panel components 53 to be attached in a linear arrangement along the top of the barrier in either or both longitudinal directions. Each lower display component 51 has a male electrical connector 67 for push-fitting into the saddle frame 50, and is individually bolted to the barrier B. This provides modularity so that, in the event of an impact, the damage is limited to only the component which is struck, and in any event, there is little likelihood that the component will break off onto the road. It also allows installation of display components on none, one, or both sides as deemed appropriate for the local situation.

The short-interval saddle units 5 have, within the top housing 60, an in-built processor, a power supply (which may be fed by solar panel components 53 if present), and communication interfaces for local wireless communication. As noted above the MCUs can communicate locally via a local area wireless protocol with nearby short interval units 5. This arrangement provides localized control with autonomous operation of the various units 2 and 5.

The short-interval saddle units 5 are spaced at, for example, 100 m gaps along the central reservation. This value may however be different, such as 50 m or 200 m depending on local road and topography conditions. These units need, however, to be close enough together so that a sequence of their displays in a linear pattern conveys a warning to the driver. Each lower display component 51 comprises an elongate planar base 65 extending downwardly and supporting an LED warning strip 66. Hence, the short-interval saddle units 5 can provide clear driver eye-level warnings based on their LED colour and whether they are flashing. The visual effect is particularly clear and strong because they are at approximately driver eye level for a passenger vehicle and are close together, with a sequence of them conveying the necessary information to the drivers. Also, each unit 5 is operable for both sides of a dual carriageway due to its laterally symmetrical arrangement and central reservation location.

The short interval units 5 are very versatile in their configurations. With use of electrical and mechanical push-fit connectors 71 and 72 solar panel components 53 may be modularly connected, and they are configured to fit in the longitudinal direction at the same level as the saddle top housing 60. This is low-profile and provides for these components to be securely supported, and with excellent exposure to sunlight due to their horizontal plane for independent powering of on-board batteries. With the arrangement of the sockets 62 any unit 5 may have a top display component 80 connected as desired. Also, depending on the site situation there may be none, one, or two lower display components 51. It is very advantageous that they can provide bi-directional warnings due to having light sources on both lateral sides and being mounted in the central reservation. Again, the arrangement of the lower display components 51 is low-profile, with the support plates 65 tight against the barrier B, minimizing chances of being impacted by a vehicle.

The short-interval saddle units 5 are preferably self-powered, although in other examples a cabled option may be deployed. There may be a solar cell array on the top of the saddle frame and/or in the longitudinal direction in the components 53. The battery pack and power regulator are built into the top housing 60. This enables maintenance of the solar array and battery to be carried out from either side of the barrier. The LEDs 66 provide visual warnings to on-coming vehicles by displaying a predefined arrangement of LEDs in response to instructions received from the roadside MCUs.

The display screens 80 on some units 5 provide visual warnings to on-coming vehicles by displaying pre-defined messages in response to instruction from the roadside MCU's. As noted above, only a subset of the units 5 have display screens 80, the more frequent purpose of the units 5 being to provide a short-interval warning illumination of the LED warning strips 66.

The deployment of the short-interval saddle units 5 is not limited to the central reservation barrier B. In other examples the short-interval saddle units 5 may be so designed to be affixed in a modular manner to other roadside furniture such as but not limited to poles, posts, and gantry structures.

MCUs 2

Each MCU 2 has digital data processors and a wired or wireless interface to send and receive commands from upstream or downstream MCUs that may have detected an incident that requires wider message distribution outside of the detecting MCU's 1 km range.

Referring to FIG. 2(*c*) in one example an MCU 2 comprises controller software applications 25, digital storage 26, and sensor interfaces 27 including a VMS interface, a CCTV interface, a RADAR interface, and a weather detection interface. In addition, there is a wireless communications interface 28 for local communication with short interval units in its local group. and a WAN wired communications interface 29. These layers reside over a cable management layer 29, an uninterruptable power supply (UPS) 30, and a power supply and distribution unit 31. As shown in FIG. 2(*d*) the controller software 25 communicates via the various interfaces with the camera 4 and with a Radar monitoring unit 33, and via the VMS handlers with short interval units 5, at the level of their digital controllers 55. In the example of this diagram some short interval units 5 are linked with local temperature sensors 35.

Although the MCUs are autonomous, they can communicate with a central control and monitoring system so that the road network operator is able to monitor the data acquired at each MCU and is able to send commands to the relevant other MCUs if required. The MCUs are in some examples spaced approximately every 1 km on opposite sides of the dual carriageway, generally as shown in FIGS.

1 and 2. This provides advantages of resilience in the event of an MCU failure, and power optimization in the event of a prolonged incident.

As noted above the MCUs 2 are autonomous, locally processing sensor signals without instruction from a remote host or server to generate warnings for upstream drivers with a very fast response time to changing local conditions in terms of traffic or weather. The MCUs communicate together to provide further advance warning.

System redundancy is achieved by the connection of the short-interval-units 5 to alternate MCUs. Thus, in the event of an MCU failing, short-interval saddle units 5 will fail to a safe condition, leaving adequate coverage by an adjacent MCU. In the event of a communications failure the MCU retains any data until connection with the central network information system is re-established.

Where a prolonged event, such as planned traffic management, occurs, then the MCUs are programmed to switch off alternate units, and bring them on when battery power has reached a low point on the operating units—effectively doubling the performance duration of the overall system without significantly reducing the operational performance of the overall system 1.

The MCUs are interconnected with longitudinal fiber optic cable. This is the preferred means of intercommunication but, in the event that a target road is not yet equipped with such infrastructure, then the system 1 can operate using a wide area wireless network such as 4G or 5G telecommunications technology. It should be noted that the deployment of the system 1 with the preferred use of fiber provides a key component for the future use of connected technology for "smart" cars. The deployment of the MCUs every 1 km will fit well with the anticipated structure of C-ITS, allowing sharing of communications (for example fiber, 4G or 5G), power sources and other infrastructure on the side of highways. The system may be modified such that it can accommodate other forms of emerging communications systems relevant to the transport industry.

Each MCU 2 is autonomous and receives signals from various sensors, and not all MCUs are necessarily equipped with the same sensors or other equipment. For example, MCUs 2 located on higher ground may have a relatively large number of ice and other weather-related sensors. The MCU processes the data from the connected sensors and issues commands to its connected short-interval saddle units 5. The MCU is a collection of components that are installed in roadside cabinets, and so space is not a problem, and they can have any desired functionality. The intelligence of the MCU is provided by an industrially rated controller. The system may be modified such that controllers applicable to emerging technologies within the transport sector can be utilized. It has no moving parts and operates under a wide range of operating temperatures. The MCU controller coordinates the data it receives from sensors, from other MCUs, and from central control and information systems, such as remote "host" servers. The MCU controller then sets a series of messages on its display screen 3 and LED light patterns on the short-interval saddle unit 5 LED warning strips 66 and the display unit 80.

The sensors are, wherever possible, interfaced to the MCU 2 via Ethernet IP or wireless or other emerging technologies as appropriate. There is autonomous control of information to drivers within the local geographic area around each MCU and adjacent MCUs. Sensors are provided to accurately and, with an acceptable level of integrity, present data to the MCU such that the MCU can make decisions on what action needs to be taken. The sensors are rated to suit the harsh roadside environment in which they will operate and provide reliable long-term operation with the minimum of maintenance, that is, to have a large Mean Time Between Failure, MTBF. They utilize industry-standard connectivity to reduce interface complexity, "Plug and Play", operate on low or very low power consumption, and are easily repaired or replaced.

The sensors include traffic data sensors to detect vehicle speed, vehicle headway, vehicle classification and vehicle presence. There are weather and environmental sensors to detect road surface temperature, ambient air temperature, air speed, visibility (fog detection), and air quality. Such sensors are available as individual products and employ technologies including radar, video-based incident detection, road embedded loops, and road embedded magnetometers. The system allows additional sensors to be accommodated in accordance with location and other requirements.

Alternative Short-Interval Saddle Unit Configurations

Referring to FIGS. 14 and 15 a short-interval saddle unit 105 comprises a housing 150 having a top central housing part 160 and separate lower display components 151. Each component 151 has a planar substrate 165 which affixes to a barrier and supports a strip 166 of LEDs. In this case there is a modular component 153 independently affixed to the top of the barrier on each longitudinal side and connected by cables (or alternatively by a connector) to the housing 150. This arrangement is essentially saddle-shaped in its overall configuration, with a top housing on top of the barrier and substrates on both sides, the substrates being electrically connected to the top housing but not mechanically connected in this case.

Referring to FIGS. 16(*a*) to (*f*) an alternative short-interval saddle unit 200 has a saddle-shaped support 210 with a pair of downwardly depending side flanges 211 joined by a top web 212 having a tube-shaped connector 213. The latter supports a pair of screen supports 215 and 216 facing in opposite directions. The support 215 has an elongate vertical web 220 and lower and upper horizontal flanges 221 and 222. The support 216 is higher and has an elongate vertical web 230 and lower and upper horizontal flanges 231 and 232. The webs 220 and 230 are interconnected by a bridging piece. The flanges 211 are arranged to support LED warning strips, not shown. This arrangement allows screens of different sizes to be mounted, however it is envisaged that in many cases the screens to be used on both sides will be similar and hence the supports will be similar. FIGS. 16(*e*) and (f) show the unit 200 with display screens 215 (*a*) and 216 (*a*) mounted to the supports 215 and 216 respectively.

The unit 200 is particularly suited for use as one in every fifth short-interval unit. The arrangement of the supports is very strong and robust, and it has the benefit of providing a display screen facing in each direction.

FIG. 17 shows an alternative with a saddle-shaped support 250 having a top part with components 251 to house the electronics. This includes an in-built processor, a power supply (which may be fed by solar panel components if present), and communication interfaces for local wireless communication with other short-interval units and/or MCUs. This provides localized control with autonomous operation of the various units 2 and 5.

System Operation

In general terms the system 1 operates in real time to automatically do the following.

- Provide advance warnings, information, and instruction to motorists of incidents, adverse weather, and roadworks
- Reduce the occurrence of secondary incidents.
- Improve safety for first and second incident responders.
- Provide a fast and efficient method for first responders to react to an incident.
- Upload data to a host, such as data concerning incidents and provide live traffic and incident data.
- Detects debris on the road.
- Detects slow and stationary vehicles.
- Can be configured to detect objects with the potential of causing dangerous situations
- Acquire traffic data, including vehicle speed, classification, and direction.

In various examples the system 1 may have any configuration of some or all of the sensors described herein. Weather sensors provide a standard set of data using industry-available equipment and the data issued by the MCUs to provide local warnings on the displays, and also to transmit data to remote servers to inform network operators of adverse weather or traffic conditions. The MCUs are programmed to use the sensor information to determine if there is a reduction in vehicle speed, leading to congestion, or very slow-moving vehicles causing congestion, or stationary vehicles. These inputs from the traffic data sensors are then processed by the MCU that then automatically determines if an advance warning needs setting, and where that advance warning needs to be provided.

Figure 2A:
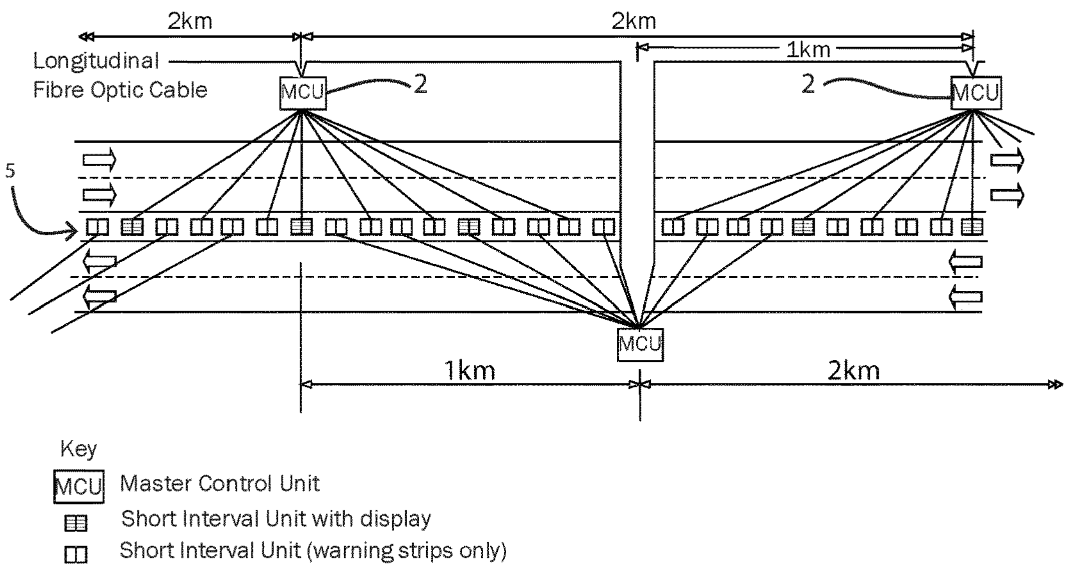
Figure 2B:
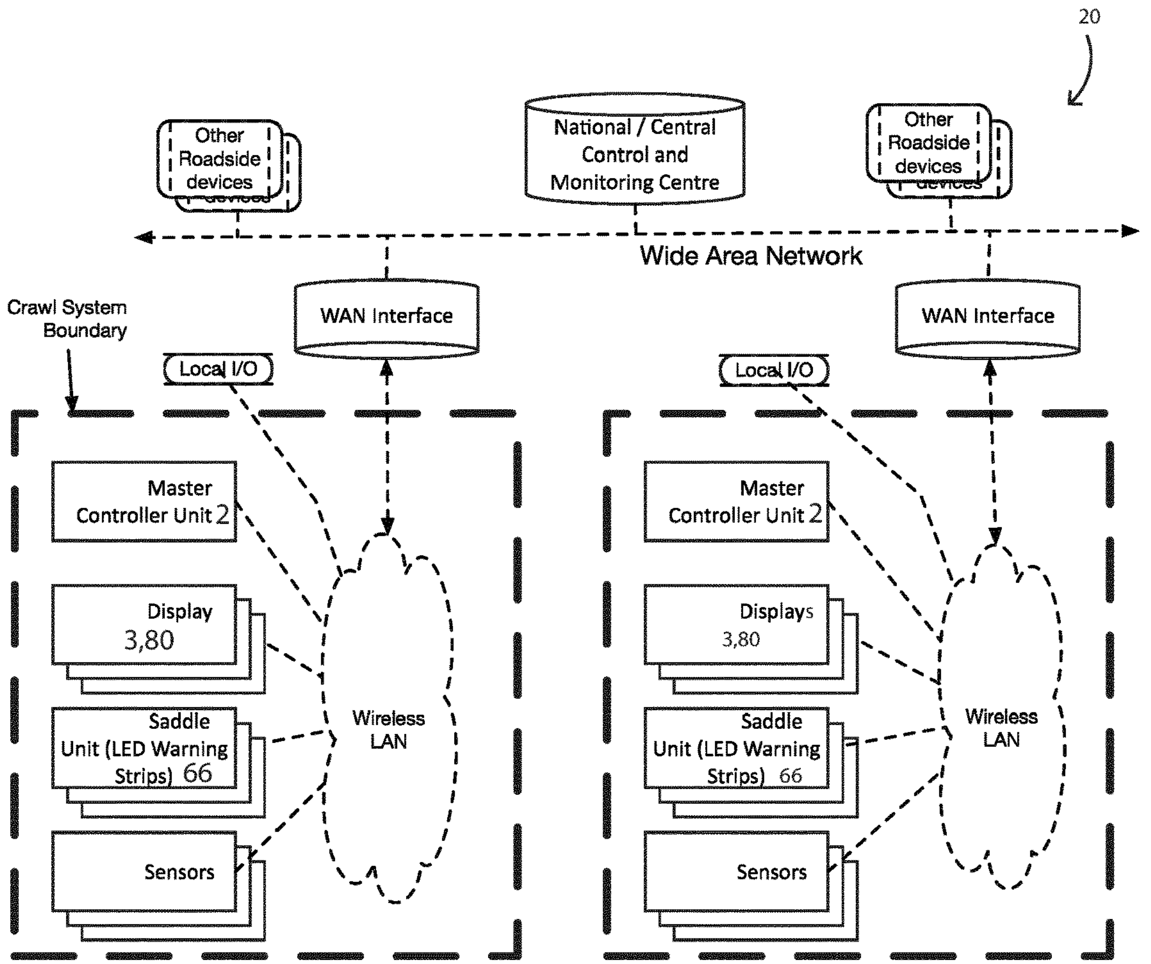
Figure 2C:
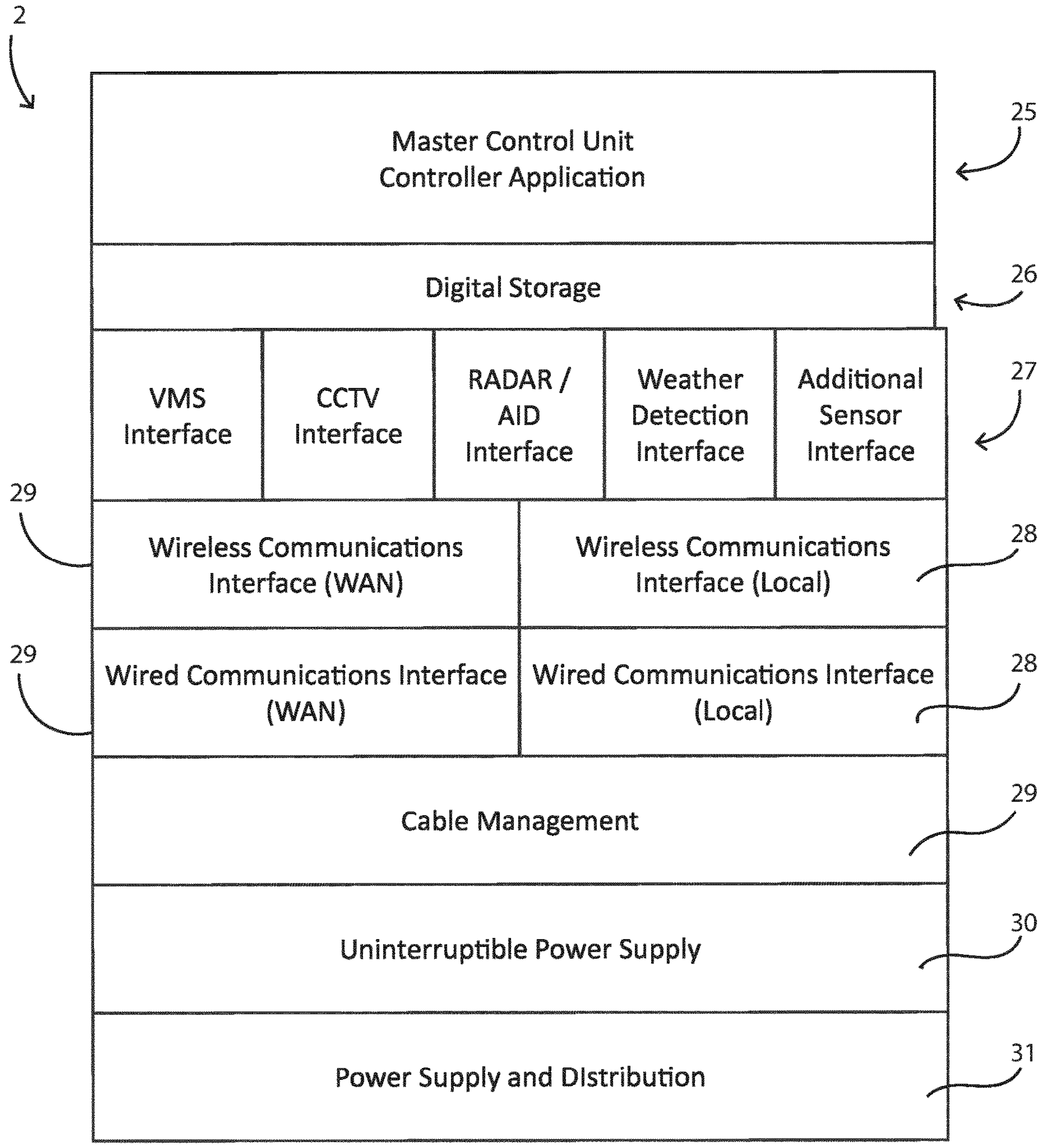
Figure 2D:
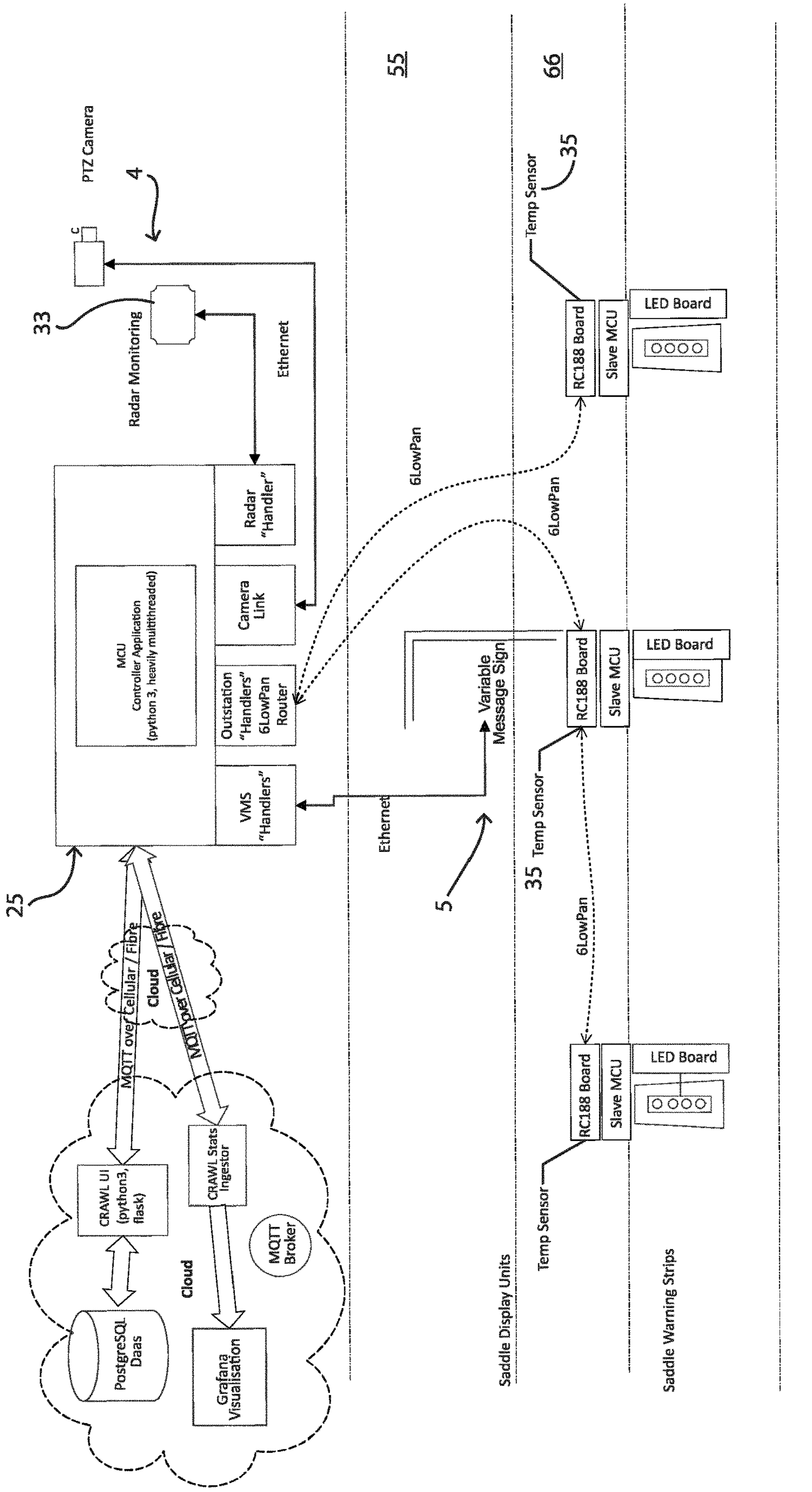

An advance warning may be to indicate queues ahead or to set a variable speed limit on upstream displays. The system provides comprehensive display of information, due to the display components 80 on top of some of the short-interval saddle units (every fifth one as shown in FIG. 2*a*)), the LED warning strip 66, the screens 3 of the MCUs. For example, the high frequency of the warning strips 66 provides for comprehensive and versatile warnings to drivers with use of any desired combination of colours, primarily red, blue, and amber.

In some examples, MCUs are capable of receiving CCTV data from locally deployed CCTV cameras 4 providing colour images in low light conditions. There may be at least two cameras at each MCU site, one facing upstream and the other facing downstream from the MCU.

Automatically Warning Drivers of Incidents Ahead

The system 1 monitors incident detection sensors, automatically detects the occurrence of traffic incidents (slow, stationary traffic) in each lane, automatically sets appropriate speed limits without human intervention, provides information about incidents to first responders (Emergency Services and Operations & Maintenance Contractors), sets appropriate colour illumination on LED warning strips in specific situations or when selected, provides information to remote systems during the incident lifecycle, and allows further control by road network operators during the incident lifecycle.

Adverse Weather, to Provide Warnings to Drivers During Adverse Weather Conditions The system 1 monitors data provided by a network of metrological sensors and weather stations, augments available data with the system's own sensor data (temperature, fog, high wind, hail, slippery surface), augments available data with 3rd party/web weather data, automatically selects and displays relevant warning signs relevant to the location, allows manual selection of appropriate warning sign legends by remote road network operator, provides information to road network operators via external systems, and sets appropriate colour illumination on LED warning strips and displays in specific situations or when selected.

Traffic Congestion, to Warn Drivers of Traffic Congestion/Queues Ahead

The system 1 monitors both external systems and its own roadside sensors (e.g. road embedded magnetometers, water level sensors) to generate the applicable warnings. It automatically determines the onset of queuing traffic, presents variable speed limits on displays, automatically selects and displays queue warning legends on upstream displays, provides data about traffic flows and queuing traffic to other systems, and displays messages as part of wider traffic management strategies selected by the national control center.

Blue Light Operations

The system 1 warns motorists of emergency services in the carriageway ahead and protects First Responders and members of the emergency services attending an incident or stopping traffic for other purposes. The system 1 sets flashing blue colour illumination on LED warning strips, sets a reduced speed on upstream displays, sets warning sign legends on displays, sets "lane closed" legends on displays, and displays information messages, e.g. incident ahead, on displays.

Planned Roadworks, to Provide Advance Warning of Roadworks or Traffic Management Deployment To provide advance warning of roadworks to drivers and to provide extra protection to traffic management operatives during the deployment of traffic management, road operations and maintenance teams need the system to display sign legends/speed limits/text messages on upstream displays 3, 80 and flashing amber on LED warning strips 66.

Permanent Edge Marking, to Provide Indication of the Carriageway Edge During Night-Time and Low Visibility Conditions In this case, the system 1 provides carriageway marking which is similar to illuminated road studs, during nighttime or during adverse weather conditions, using a small number of coloured LEDs on an appropriate number of short-interval saddle units 5.

Ghost Driver Warning

In this use case the system is configured to detect vehicles proceeding along the carriageway in the wrong direction and will through predefined algorithms set appropriate messages and warnings.

The CRAWL system 1 is expandable in technology and functionality and can be configured to accommodate amendments/enhancements to the use cases and include additional use cases according to conditions.

Referring to FIG. 18 operation of the system 1 for a stopped-vehicle traffic incident is illustrated. Importantly, an automatic incident detection algorithm is executed to determine a response to a detected stopped vehicle, providing appropriate signals to upstream short-interval saddle units 5 to activate the warning strips 66 and the displays 3 and 80, and to MCUs for a distance which is pre-set for such an incident, typically 3-4 km. The system communicates signals to cause display of a particular message. A message may be a warning, as effectively generated by the warning strips 66 operated in groups. As illustrated, it is particularly effective that the upper display components 80 (on a subset of the short-interval saddle units 5) can display a traffic limit symbol, while the LED strips 66 can warn in the applicable manner according to a combination of LED colours.

Referring to FIG. 19, external inputs drive the system operation for planned road works, and the system processors (either in the central host bank of servers or in an MCU) automatically determine the applicable displays for the geographical region. The system 1 automatically closes the incident according to the external actuation input such as the national control center. The decision to close an incident will be based on continuous monitoring of the incident life cycle by the system and its inputs such as sensors and CCTV.

Referring to FIG. 20 the sensors detect an adverse weather event such as hail and/or an external input is provided, and again the versatility provided by the different types of displays on the short-interval saddle units 5 and the MUCs and their locations are particularly effective at providing warnings. As shown in FIG. 21, traffic congestion is detected by image processing of camera feeds and/or vehicle presence detectors, causing the system to automatically inform external parties and control the various displays in the pre-set manner. These illustrations show particularly the benefits of the bi-directional nature of the short-interval saddle units 5.

Advantages

The following summarises the major advantages arising from systems of the invention.

- Improved safety for all personnel attending an incident.
- Reduced the delay in detecting incidents and in responding to incidents
- Reduced occurrence of secondary incidents.
- Improve advance warning to drivers of incidents on the road and surface condition state
- Improved driver behaviour in adverse weather conditions.
- Improved warnings and instruction to drivers of road maintenance activity, of congestion ahead, and of adverse weather including fog and hail
- Frequently spaced signs possible due to low cost and simple construction.
- Autonomous—does not rely on central control
- Signs activated automatically, manually or from control centre
- Wireless communication between units locally
- Design to ensure low power consumption to enable the power supply to be derived from solar power.
- No gantries
- Passively safe housings/materials according to the applicable standards for signage.
- Minimal cabling/ducting infrastructure
- Self-configuring according to location 'plug and play', giving low overhead.
- Units easily replaced
- Open architecture
- Different sensor types can be integrated to suit local requirements
- Expandable system to accommodate varying levels of functional requirement
- The ability to implement variable speed limits and control approach speeds.

The invention is not limited to the embodiments described but may be varied in construction and detail. Some short-interval saddle units may be connected to sensors and have processors which are capable of processing sensor signals to operate its light sources and possible to communicate signals to nearby units. Each lower display component may have LEDS and displays to provide appropriate warnings in the event of "ghost drivers", driving on the wrong side of a carriageway. In other examples the short-interval saddle units may be configured to fit to a metal fence barrier when central reserve concrete barriers are not provided, or even in some cases they may be configured to fit to individual posts where required.

The invention claimed is:

1. A real time safety information system for providing real time information to drivers on roads, the system comprising:

a plurality of short-interval units each adapted to be mounted along a road central reservation at separations in the range of 50 m to 500 m, and each comprising:
- a digital data processor,
- a communications interface, and
- at least one display component for conveying advance driver warning information when viewed in a sequence in a linear pattern along a road with other short interval unit display components, wherein:
- at least some of the short-interval units are configured to fit to a central reservation barrier of a dual carriageway, and
- at least some of the short-interval units are configured to provide driver warnings on both sides of a dual carriageway, bi-directionally for drivers approaching from both directions; and a plurality of longer-interval master control unit MCUs for roadside mounting, each comprising a digital data processor, and a communications interface, and in which the processor is configured to generate and communicate signals to short-interval units in a local area group and with other MCUs over a wide area network, wherein:
- each MCU is configured to determine that a warning is to be provided to approaching drivers, and to communicate a command in said signals to nearby short-interval units in said local group, and each said short interval unit is configured to activate its display to provide a driver warning in a linear pattern,
- at least some of the MCUs are linked with sensors for weather condition sensing and traffic condition sensing, and in which their processors are configured to process sensor feeds and in which said MCU is configured to determine that a warning should be provided by said short-interval units in said local group according to sensor signals, and to communicate via said signals to the short interval units in the local group that a warning should be provided,
- the MCUs and the short-interval units are configured to operate in a coordinated manner to provide real time information to driver, and
- the short-interval unit display components are configured to generate displays which do not include a written message required to be read by a driver but provide simple warnings due to any one or more selected from color, intensity, and/or blinking frequency of light sources, at least some of the MCUs are configured to communicate with a central control and monitoring system so that a road network operator is able to monitor data acquired at each MCU and is able to send commands to the relevant other MCUs if required, and at least some of the MCUs are configured to operate in an autonomous manner without instruction from a remote server or host including that of a central control and monitoring system of a road network operator, to make decisions on local real time advance warnings, wherein the processors of at least some of the MCUs are configured to receive image data from cameras.

2. The real time safety information system as claimed in claim 1, wherein at least some of the MCUs comprise a display which is controlled by said MCU processor.

3. The real time safety information system as claimed in claim 1, wherein at least some of the MCUs are linked with sensors for weather or traffic condition sensing, and in which their processors are configured to process sensor feeds; and wherein the processors of at least some of the MCUs are configured to operate in real time to automatically:

acquire traffic condition and weather condition data, and to process said condition data to determine that there are reasons for driver warnings and to communicate with local short-interval units and upstream MCUs to instruct them to generate warning displays.

4. The real time safety information system as claimed in claim 1, wherein at least some of the MCUs are linked with sensors for weather or traffic condition sensing, and in which their processors are configured to process sensor feeds; and wherein said sensors include sensors for weather conditions, road conditions, and vehicles.

5. The real time safety information system as claimed in claim 1, wherein the short- interval units are configured to be mounted with a separation in the range of 50 m to 500 m apart.

6. The real time information system as claimed in claim 1, wherein a sub-set of the short-interval units includes a display screen for displaying a pictorial or textual driver message which is coordinated with the display component operation.

7. The real time safety information system as claimed in claim 1, wherein the processors of at least some of the MCUs are configured to operate in a control scheme as instructed by a central host server; and optionally the processors of at least some of the MCUs are configured to temporarily enter a sleep mode in a pattern of a plurality of units in order to save available power.

8. The real time information system as claimed in claim 1, wherein the processors of at least some of the MCUs are configured to cause higher-resolution image data to be received and processed on a selective basis according to events locally.

9. A method of operation of a real time information system of claim 1, the method comprising:

a first MCU determining that a warning is to be provided to approaching drivers, and the first MCU communicating a command to nearby short-interval units, and said units activating their displays to provide a driver warning in a linear pattern with short intervals in the range of 50 m to 500 m.

10. The method as claimed in claim 9, wherein at least some of the short-interval units provide driver warnings on both sides of a dual carriageway, bi-directionally for drivers approaching from both directions.

11. The method as claimed in claim 9, wherein the first MCU additionally communicates warning information to other MCUs, upon which they cause their nearby short-interval units to provide a driver warning for drivers approaching from further away.

12. The method as claimed in claim 9, wherein at least one MCU provides a warning display on a display screen to complement the warning provided by the short-interval units.

13. The method as claimed in claim 9, wherein the first MCU determines that a warning should be provided according to sensor signals from sensors located nearby.

14. The method as claimed in claim 9, wherein the first MCU operates in an autonomous manner to cause the driver warnings to be provided, without need for an instruction from a remote host.

* * * * *